US012603671B2

(12) United States Patent
Huang

(10) Patent No.: US 12,603,671 B2
(45) Date of Patent: Apr. 14, 2026

(54) SIM CARD COMMUNICATION CIRCUIT, RELATED APPARATUS, AND CONTROL METHOD

(71) Applicant: Honor Device Co., Ltd., Shenzhen (CN)

(72) Inventor: Ting Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 239 days.

(21) Appl. No.: 18/567,261

(22) PCT Filed: May 5, 2023

(86) PCT No.: PCT/CN2023/092266
§ 371 (c)(1),
(2) Date: Dec. 5, 2023

(87) PCT Pub. No.: WO2024/012020
PCT Pub. Date: Jan. 18, 2024

(65) Prior Publication Data
US 2025/0088209 A1 Mar. 13, 2025

(30) Foreign Application Priority Data
Jul. 13, 2022 (CN) .......................... 202210818821.0

(51) Int. Cl.
*H04B 1/3818* (2015.01)
*H04B 1/3816* (2015.01)
(Continued)

(52) U.S. Cl.
CPC .......... *H04B 1/3818* (2015.01); *H04B 1/401* (2013.01); *H04W 8/205* (2013.01); *H04W 52/028* (2013.01); *H04W 88/06* (2013.01)

(58) Field of Classification Search
CPC .... H04B 1/3816; H04B 1/3818; H04B 1/401; H04W 8/205; H04W 52/028; H04W 88/06
(Continued)

(56) References Cited

U.S. PATENT DOCUMENTS 12,273,958 B2 * 4/2025 Li ......................... H04W 8/183
12,369,211 B2 * 7/2025 Wei ........................ H04W 48/18
(Continued)

FOREIGN PATENT DOCUMENTS

CN 109195189 A 1/2019
CN 209805804 U 12/2019
(Continued)

OTHER PUBLICATIONS

Pei, Yang et al., "The current situation and development prospect of eSIM technology," Digital Communication World, Feb. 18, 2019, 4 pages.
(Continued)

*Primary Examiner* — Jinsong Hu
(74) *Attorney, Agent, or Firm* — Slater Matsil, LLP

(57) ABSTRACT

Embodiments of this application provide a SIM card communication circuit, a related apparatus, and a control method. The circuit includes a processor, a switch unit, a first card slot, and an ESIM chip. An input terminal, a first output terminal, and a second output terminal of the switch unit are respectively connected to the processor, the first card slot, and the ESIM chip. The processor is configured to control the switch unit to choose to connect to the first card slot when receiving a first message; or the processor is configured to control the switch unit to be connected to the ESIM chip when receiving a second message. In this way, multiplexing of a SIM interface is realized through the (Continued)

switch unit, which can realize both communication of an ESIM card and communication of a physical SIM card.

19 Claims, 13 Drawing Sheets

(51) Int. Cl.

| | | |
|---|---|---|
| *H04B 1/401* | (2015.01) | |
| *H04W 8/20* | (2009.01) | |
| *H04W 52/02* | (2009.01) | |
| *H04W 88/06* | (2009.01) | |

(58) Field of Classification Search

USPC .......................................................... 455/410

See application file for complete search history.

(56) References Cited

U.S. PATENT DOCUMENTS

| | | | | |
|---|---|---|---|---|
| 2016/0094930 | A1* | 3/2016 | Ramanna | H04B 1/3816 |
| | | | | 455/558 |
| 2016/0330784 | A1 | 11/2016 | Liu et al. | |
| 2017/0048645 | A1* | 2/2017 | Yerrabommanahalli | ..................... |
| | | | | H04W 68/005 |
| 2017/0126264 | A1* | 5/2017 | Nam | H04B 1/3816 |
| 2017/0214423 | A1* | 7/2017 | Park | H04B 1/3816 |
| 2018/0220293 | A1 | 8/2018 | Huang et al. | |
| 2020/0383152 | A1* | 12/2020 | Walia | H04W 76/12 |
| 2021/0136849 | A1* | 5/2021 | Nimmala | H04W 68/005 |
| 2021/0250430 | A1 | 8/2021 | Moon | |
| 2022/0210632 | A1* | 6/2022 | Tseng | H04W 8/183 |
| 2022/0240079 | A1* | 7/2022 | Lovlekar | H04W 68/12 |
| 2023/0082676 | A1* | 3/2023 | Verma | H04W 24/06 |
| | | | | 370/252 |
| 2024/0072834 | A1* | 2/2024 | Xie | H04B 5/72 |
| 2024/0305960 | A1* | 9/2024 | Tripathi | H04W 4/16 |

FOREIGN PATENT DOCUMENTS

| | | | |
|---|---|---|---|
| CN | 211063613 | U | 7/2020 |
| CN | 112232096 | A | 1/2021 |
| CN | 113453214 | A | 9/2021 |
| CN | 215493959 | U | 1/2022 |
| CN | 215897719 | U | 2/2022 |
| CN | 114884528 | A | 8/2022 |
| WO | 2020165826 | A1 | 8/2020 |
| WO | 2021233159 | A1 | 11/2021 |
| WO | 2022045705 | A1 | 3/2022 |

OTHER PUBLICATIONS

Samanvita, S. et al., "Testing of eSIM Profile Management," 2021 International Conference on Smart Generation Computing, Communication and Networking (SMART GENCON), Dec. 21, 2021, 9 pages, IEEE.

* cited by examiner

SIM CARD COMMUNICATION CIRCUIT, RELATED APPARATUS, AND CONTROL METHOD

CROSS-REFERENCE TO RELATED APPLICATIONS

This application is a national stage of International Application No. PCT/CN2023/092266, filed on May 5, 2023, which claims priority to Chinese Patent Application No. 202210818821.0, filed on Jul. 13, 2022. The disclosures of both of the aforementioned applications are hereby incorporated by reference in their entireties.

TECHNICAL FIELD

This application relates to the field of terminal technologies, and in particular, to a SIM card communication circuit, a related apparatus, and a control method.

BACKGROUND

In a communication network, a subscriber identification module (subscriber identification module, SIM card) card is not only a subscriber identification card, but also a service carrier. An ESIM card is an embedded SIM card that can integrate the SIM card information into a device chip. Compared to a physical SIM card, the ESIM card is similar to a virtual SIM card. On a terminal device where the ESIM card may be used, a user can choose an operator network and a package through software registration or direct purchase, without requiring the user to insert a physical SIM card.

However, the ESIM card has shortcoming in technical promotion and generalization.

SUMMARY

Embodiments of this application provide a SIM card communication circuit, a related apparatus, and a control method, which are applicable to the field of terminal technologies. Multiplexing of a SIM interface is realized by a switch unit; and in a case that a processor is not required to increase the SIM interface, both communication of an ESIM card and communication of a physical SIM card can be realized. A size and an occupied area of the processor remain unchanged. In addition, circuits with and without an ESIM chip may use a same processor, and such a common layout facilitates production.

According to a first aspect, an embodiment of this application provides a SIM card communication circuit. The circuit includes a processor, a switch unit, a first card slot, and an ESIM chip. The processor is connected to an input terminal of the switch unit, and a first output terminal and a second output terminal of the switch unit are respectively connected to the first card slot and the ESIM chip. The processor is configured to control the switch unit to choose to connect to the first card slot when receiving the first message, to implement connection between the processor and a first physical SIM card in the first card slot; or the processor is configured to control the switch unit to be connected to the ESIM chip when receiving a second message, to implement connection between the processor and an ESIM card in the ESIM chip.

In this way, by changing the connection manner of the switch unit, the switching of the first physical SIM card and the ESIM card is implemented, and practicability and applicability of the terminal device are increased. In addition, the processor is not changed, and the size and the occupied area of the processor remain unchanged; and circuits without and with the ESIM chip can use a same processor, and such a common layout can reduce difficulty the difficulty of material preparation of the processor and reduce the production cost.

Optionally, the processor includes a first port, a second port, and a third port, the first port is configured to transmit a data DATA signal, the second port is configured to transmit a reset RST signal, and the third port is configured to transmit a clock CLK signal; the input terminal of the switch unit includes a fourth port, a fifth port, and a sixth port, the first output terminal of the switch unit includes a seventh port, an eighth port, and a ninth port, the second output terminal of the switch unit includes a tenth port, an eleventh port, and a twelfth port; the first card slot includes a thirteenth port, a fourteenth port, and a fifteenth port; the ESIM chip includes a sixteenth port, a seventeenth port, and an eighteenth port; the first port, the second port, and the third port are respectively connected to the fourth port, the fifth port, and the sixth port; the seventh port, the eighth port, and the ninth port are respectively connected to the thirteenth port, the fourteenth port, and the fifteenth port, and the tenth port, the eleventh port, and the twelfth port are respectively connected to the sixteenth port, the seventeenth port, and the eighteenth port.

The processor is further configured to control the fourth port, the fifth port, and the sixth port to be connected to the seventh port, the eighth port, and the ninth port respectively when receiving the first message, to implement connection between the processor and the first physical SIM card in the first card slot; or the processor is further configured to control the fourth port, the fifth port, and the sixth port to be connected to the tenth port, the eleventh port, and the twelfth port respectively when receiving the second message, to implement connection between the processor and an ESIM card in the ESIM chip.

In this way, the DATA signal, the reset RST signal, and the clock CLK signal can be transmitted between the processor and the physical SIM card; and the DATA signal, the reset RST signal, and the clock CLK signal can be transmitted between the processor and the ESIM card.

Optionally, the switch unit includes one first switch. The first switch includes the fourth port, the fifth port, the sixth port, the seventh port, the eighth port, the ninth port, the tenth port, the eleventh port, and the twelfth port.

In this way, multiplexing of a SIM interface is realized by a switch.

Optionally, the switch unit includes a second switch and a third switch. The second switch includes the fourth port, the fifth port, the seventh port, the eighth port, the tenth port, and the eleventh port; and the third switch includes the sixth port, the ninth port, and the twelfth port.

In this way, multiplexing of the SIM interface is realized by two switches. In addition, two switches are more commonly used and less expensive than one switch.

Optionally, the circuit further includes a MOS transistor. The MOS transistor is located between the switch unit and the ESIM chip; and the processor is further configured to control the MOS transistor to be turned on when receiving the first message, so that the ESIM chip is maintained at a low level; or control the MOS transistor to be open-circuited when receiving the second message.

In this way, the ESIM chip is maintained at a low level when the ESIM chip does not operate. When the ESIM chip is integrated with an NFC chip, the NFC chip that is integrated with the ESIM chip can enter a low power consumption mode to reduce a power consumption of a terminal device. In addition, when the processor communicates with the ESIM card, the MOS transistor does not affect signal transmission between the processor and the ESIM card.

Optionally, the MOS transistor is located between the twelfth port and the eighteenth port.

Optionally, the switch unit further includes a nineteenth port, a twentieth port, and a twenty-first port. The nineteenth port is connected to the twelfth port, the twentieth port is grounded, and the twenty-first port is open-circuited; the processor is further configured to control the nineteenth port to be connected to the twentieth port when receiving the first message; or the processor is further configured to control the nineteenth port to be connected to the twenty-first port when receiving the second message.

In this way, the ESIM chip is maintained at a low level when the ESIM chip does not operate. When the ESIM chip is integrated with an NFC chip, the NFC chip that is integrated with the ESIM chip can enter a low power consumption mode to reduce a power consumption of a terminal device. In addition, when the processor communicates with the ESIM card, the MOS transistor does not affect signal transmission between the processor and the ESIM card.

Optionally, when the switch unit includes a first switch, the first switch further includes the nineteenth port, the twentieth port, and the twenty-first port.

In this way, the ESIM chip is maintained at a low level when the ESIM chip does not operate. When the ESIM chip is integrated with an NFC chip, the NFC chip that is integrated with the ESIM chip can enter a low power consumption mode to reduce a power consumption of a terminal device. In addition, when the processor communicates with the ESIM card, the MOS transistor does not affect signal transmission between the processor and the ESIM card.

Optionally, when the switch unit includes the second switch and the third switch, the third switch further includes a nineteenth port, a twentieth port, and a twenty-first port.

Optionally, the circuit further includes a first level conversion apparatus, where the first level conversion apparatus is located between the processor and the first card slot.

In this way, the communication between the processor and the first physical SIM card in the first card slot at different voltage specifications or the same voltage specification can be implemented through the first level conversion apparatus. The first card slot may be adapted to assemble different types of SIM cards, increasing practicality and applicability of the terminal device.

Optionally, the circuit further includes a second card slot. The second card slot is connected to the processor, to implement connection between the processor and the second physical SIM card in the second card slot.

In this way, the processor may also communicate with the second physical SIM card.

Optionally, the circuit further includes a second card slot, where the second card slot includes a twenty-second port, a twenty-third port, and a twenty-fourth port; the processor further includes a twenty-fifth port, a twenty-sixth port, and a twenty-seventh port, the twenty-fifth port is configured to transmit a DATA signal, the twenty-sixth port is configured to transmit an RST signal, and the twenty-seventh port is configured to transmit a CLK signal; and the twenty-fifth port, the twenty-sixth port and the twenty-seventh port are respectively connected to the twenty-second port, the twenty-third port, and the twenty-fourth port, to implement connection between the processor and a second physical SIM card in the second card slot.

Optionally, the circuit further includes a second level conversion apparatus, where the second level conversion apparatus is located between the processor and the second card slot.

In this way, the communication between the processor and the second physical SIM card in the second card slot at different voltage specifications or the same voltage specification can be implemented through the second level conversion apparatus. The second card slot may be adapted to assemble different types of SIM cards, increasing practicality and applicability of the terminal device.

According to a second aspect, an embodiment of this application provides a terminal device. The terminal device may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and the like.

The terminal device further includes any one of the SIM communication circuits according to the first aspect. The circuit is configured to implement the communication between the processor and the first physical SIM card, or to implement the communication between the processor and the ESIM card.

According to a third aspect, an embodiment of this application provides a SIM card control method. The method includes: receiving, by the processor, first information for indicating selection of the first physical SIM card; controlling, by the processor, the switch unit to choose to connect to the first card slot based on the first information; or, receiving, by the processor, second information for indicating selection of an ESIM card, and controlling, by the processor, the switch unit to choose to connect to the ESIM chip based on the second information.

Optionally, the controlling, by the processor, the switch unit to choose to connect to the first card slot based on the first information includes: controlling, by the processor, the fourth port, the fifth port, and the sixth port to be connected to the seventh port, the eighth port, and the ninth port respectively based on the first information; and the controlling, by the processor, the switch unit to choose to connect to the ESIM chip based on the second information includes: controlling, by the processor, the fourth port, the fifth port, and the sixth port to be connected to the tenth port, the eleventh port, and the twelfth port respectively based on the second information.

Optionally, the method further includes: controlling, by the processor, a MOS transistor to be turned on based on the first information; or controlling, by the processor, the MOS transistor to be turned off based on the second information.

Optionally, the method further includes: controlling, by the processor, the nineteenth port to be connected to the twentieth port based on the first information; or controlling, by the processor, the nineteenth port to be connected to the twenty-first port based on the second message.

According to a fourth aspect, an embodiment of this application provides a terminal device. The terminal device includes a processor and a memory. The memory is configured to store computer-executable instructions. The processor is configured to perform the computer-executable instructions stored in the memory, causing the terminal device to perform the method according to the third aspect.

According to a fifth aspect, an embodiment of this application provides a computer-readable storage medium, and a computer program is stored in the computer-readable storage medium. The computer program, when executed by the processor, causes the method according to the third aspect to be performed.

According to a fourth aspect, an embodiment of this application provides a computer program product. The computer program product includes a computer program, and when the computer program runs on a computer, the computer is enabled to perform the method according to the third aspect.

According to a fourth aspect, an embodiment of this application provides a chip. The chip includes a processor, and the processor is configured to call a computer program in a memory to perform the method according to the third aspect.

It should be understood that the second aspect to the fourth aspect of this application correspond to the technical solution of the first aspect of this application, and the beneficial effects obtained by each aspect and the corresponding feasible implementations are similar. Details are not described herein again.

6

DETAILED DESCRIPTION OF ILLUSTRATIVE EMBODIMENTS

Figure 1:
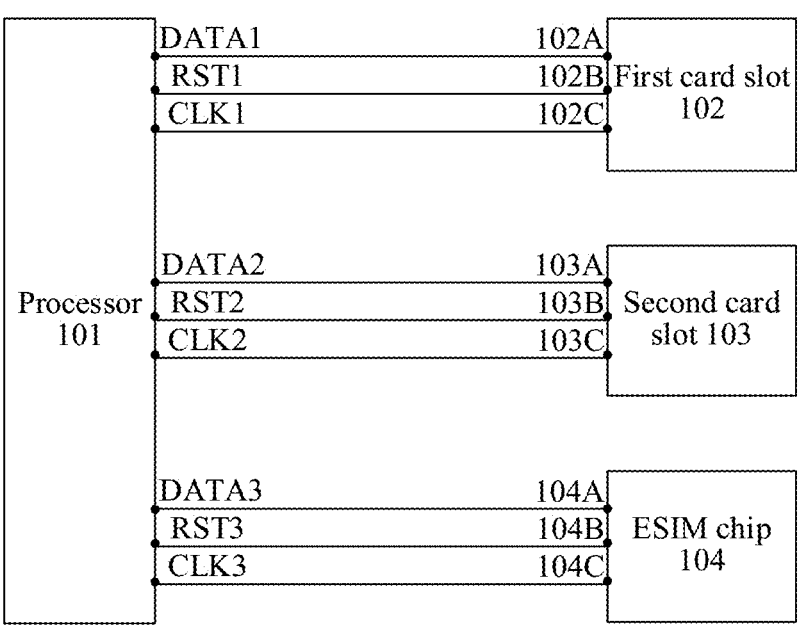
FIG. 1 is a schematic diagram of a circuit structure in a possible design.

To clearly describe the technical solutions in embodiments of this application, in embodiments of this application, the terms, such as "exemplarily" and "for example", are used to represent giving an example, an illustration, or a description. Any embodiment or design scheme described as an "exemplary" or "for example" in this application should not be explained as being more preferred or having more advantages than another embodiment or design solution. In particular, the terms such as "exemplary" and "example" as used herein are intended to present the related concept in a specific implementation.

In embodiments of this application, "at least one" refers to one or more, and "a plurality of" refers to two or more. The term "and/or" is an association relationship for describing associated objects and represents that three relationships may exist. For example, A and/or B may represent the following three cases: only A exists, both A and B exist, and only B exists, where A and B may be singular or plural. The character "/" in this specification generally indicates an "or" relationship between the associated objects. "At least one of the following items" or a similar expression thereof indicates any combination of these items, including a single item or any combination of a plurality of items. For example, at least one of a, b, or c may represent: a, b, c, a-b, a-c, b-c, or a-b-c, where a, b, and c may be single or multiple.

It should be noted that in embodiments of this application, "when . . . " may be an instantaneous occurrence time of a case, or may be a period of time after occurrence of a case, and this is not specifically limited in embodiments of this application. In addition, a display interface provided by embodiments of this application is only an example, and the display interface may further include more or less content.

For ease of understanding, example descriptions of some concepts related to the embodiments of this application are provided for reference.

1. A subscriber identification module card (subscriber identification module, SIM card) is a personal data card for a global digital mobile phone. The SIM card stores data, an authentication method, and a key of a user, which may be configured to authenticate identity of the user through a communication network. Meanwhile, the user completes the connection and information exchange with a communication system through the SIM card. It may be understood that the SIM card is not only a user identification card, but also a service carrier in the communication network. The SIM card is configured to store relevant data of the user, and is to authenticate the user and prevent an illegal user from entering the network.

In embodiments of this application, the SIM card may also be referred to as a universal subscriber identity module (universal subscriber identity module, USIM) card, a universal integrated circuit card (universal integrated circuit card, UICC), a smart card, or the like.

2. Embedded-SIM card (embedded-SIM, ESIM card): The ESIM card may be embedded in a circuit board of a terminal device and cannot be separated from the terminal device.

Compared with a physical SIM card, the ESIM card is a blank SIM chip welded directly in the terminal device, and the user can write the terminal device through air download, to achieve a same function as the physical SIM card.

The SIM card communication circuit of the embodiment of this application may be applicable to an electronic device having a communication function. The electronic device includes a terminal device, which may also be referred to as a terminal (terminal), user equipment (user equipment, UE), a mobile station (mobile station, MS), a mobile terminal (mobile terminal, MT), or the like. The terminal device may be a mobile phone (mobile phone), a smart television, a wearable device, a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), and the like. The embodiments of this application impose no limitation on a specific technology and a specific device form used by the terminal device.

The SIM card is not only a user identification card, but also a service carrier in the communication network. An ESIM card is an embedded SIM card that can integrate the SIM card information into a device chip. Compared to a physical SIM card, the ESIM card is similar to a virtual SIM card. On a terminal device where the ESIM card may be used, a user can choose an operator network and a package through software registration or direct purchase, without requiring the user to insert a physical SIM card.

However, the ESIM card has shortcoming in technical promotion and generalization. Therefore, a compatible design is necessarily to be added on a current terminal device, to ensure applicability and versatility of the terminal device.

In a possible design, the terminal device equipped with the physical SIM card such as a mobile phone realizes connection between the processor and the ESIM card by adding a set of SIM interfaces, thereby realizing the compatible design of the physical SIM card and the ESIM card.

For example, FIG. 1 is a schematic diagram of a switch circuit between an SIM card and an ESIM in a possible design. The terminal device equipped with two physical SIM cards as an example. As shown in FIG. 1, the circuit includes a processor 101, a first card slot 102, a second card slot 103, and an ESIM chip 104. In the circuit shown in FIG. 1, the SIM interface of the processor 101 is respectively connected to the first card slot 102, the second card slot 103, and the ESIM chip 104.

The first card slot 102 is configured to assemble the first physical SIM card. The first card slot 102 includes three input terminals, which are a port for transmitting a data signal (a port 102A), a port for transmitting a reset signal (a port 102B), and a port for transmitting a clock signal (a port 102C).

The second card slot 103 is configured to assemble the second physical SIM card. The second card slot 103 includes three input terminals, which are a port for transmitting a data signal (a port 103A), a port for transmitting a reset signal (a port 103B), and a port for transmitting a clock signal (a port 103C).

It may be understood that the first physical SIM card may be a Nano SIM card, a Micro SIM card, and the like; and the second physical SIM card may be a Nano SIM card, a Micro SIM card, and the like, which are not limited in the embodiment of this application. A type of the first physical SIM card may be the same as or different from a type of the second physical SIM card, which is not limited by embodiments of this application.

The ESIM chip 104 includes three input terminals, which are a port for transmitting a data signal (a port 104A), a port for transmitting a reset signal (a port 104B), and a port for transmitting a clock signal (a port 104C). Embodiment of this application do not limit a specific model, a specification, and the like of the ESIM chip 104.

The processor 101 configured to interact with a communication network through any one of the first physical SIM card, the second physical SIM card, and the ESIM card to implement functions such as call and data communication of the terminal device.

The processor 101 may be a system on chip (system on chip, SOC), a micro control unit (micro control unit, MCU), or the like. The processor 101 may also be referred to as a controller. A specific structure of the processor 101 is not limited in embodiments of this application. In a possible design, the processor 101 includes three sets of SIM interfaces, which are configured to connect the first card slot 102, the second card slot 103, and the ESIM chip 104. Each set of SIM interfaces includes three ports, which are a port for transmitting a data signal (may be referred to as a DATA port and an I/O port), a port for transmitting a reset signal (may be referred to as a RESET port and an RST port), and a port for transmitting a clock signal (may be referred to as a CLK port).

As shown in FIG. 1, the processor 101 includes 3 sets of SIM interfaces with a total of nine ports, which are a port DATA1, a port RST1, a port CLK1, a port DATA2, a port RST2, a port CLK2, a port DATA3, a port RST3, and a port CLK3.

The port DATA1, the port RST1, and the port CLK1 are respectively connected to the three ports (the port 102A, the port 102B, and the port 102C) of the first card slot 102, to implement connection between the processor and the first physical SIM card. The port DATA2, the port RST2, and the port CLK2 are respectively connected to the three ports (the port 103A, the port 103B, and the port 103C) of the second card slot 103, to implement connection between the processor and the second physical SIM card. The port DATA3, the port RST3, and the port CLK3 are respectively connected to the three ports (the port 104A, the port 104B, and the port 104C) of the ESIM chip 104, to implement connection between the processor and the ESIM card.

In this way, the terminal device can communicate by using the first physical SIM card, the second physical SIM card, and the ESIM card.

However, the way the SIM interface is added increases a size of the processor, increase an occupied area, and increase a size of the terminal device. In addition, the design of a processor in the circuit with the ESIM chip added is different from a processor in the circuit without the ESIM chip, which increases the difficulty of material preparation and is not conducive to production of the terminal device.

Based on the above, an embodiment of this application provides a SIM card communication circuit, which realizes the ESIM card and the physical SIM card share a set of SIM interface through the switch unit, and the terminal device can realize the ESIM card communication and the communication of the physical SIM card. Moreover, the processor does not require an additional interface, and a size and an occupied area of the processor remain unchanged. In addition, circuits without and with the ESIM chip can use a same processor, and such a common layout facilitates production and reduces difficulty of material preparation for the processor.

The SIM card communication circuit provided by embodiments of this application is described below with reference to FIG. 2 to FIG. 11.

Figure 2:
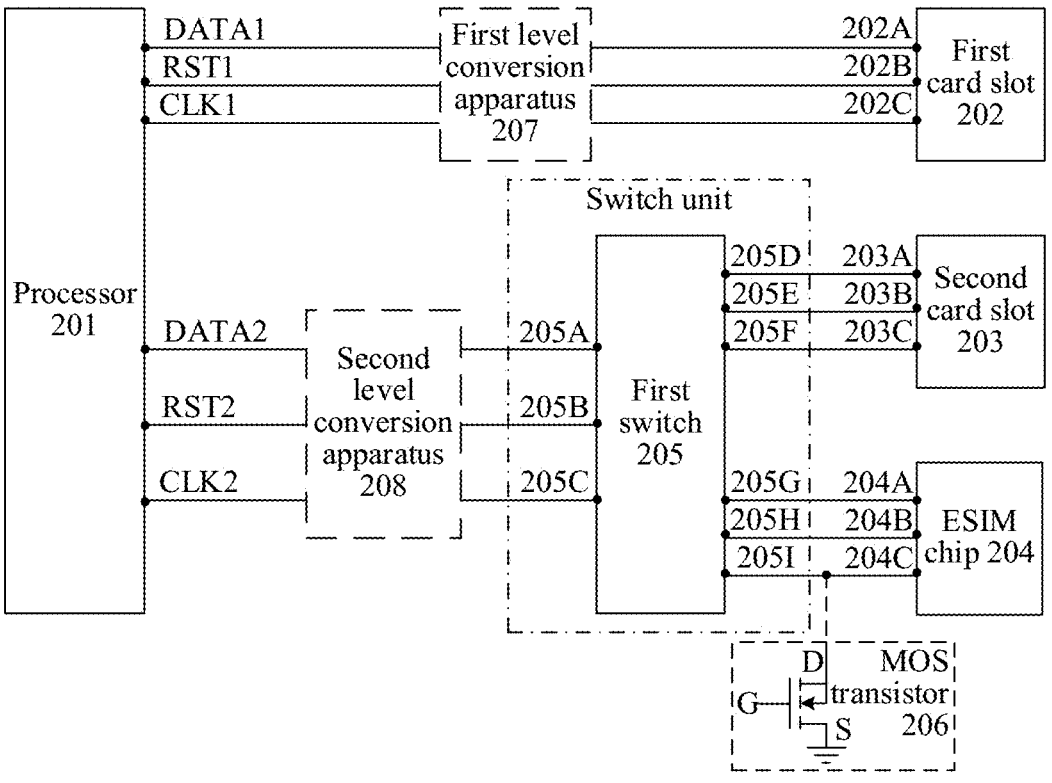
FIG. 2 is a schematic structural diagram of a circuit structure according to an embodiment of this application;

FIG. 2 is a schematic structural diagram of a SIM card communication circuit according to an embodiment of this application. As shown in FIG. 2, the circuit includes a processor 201, a first card slot 202, a second card slot 203, an ESIM chip 204, and a first switch 205.

In the circuit shown in FIG. 2, a SIM interface of the processor 201 is respectively connected to an input terminal of the first card slot 202 and the first switch 205; and a first output terminal and a second output terminal of the first switch 205 are respectively connected to the second card slot 203 and the ESIM chip 204.

The first card slot 202 is configured to assemble the first physical SIM card. The first card slot 202 includes three input terminals, which are a port for transmitting a data signal (a port 202A), a port for transmitting a reset signal (a port 202B), and a port for transmitting a clock signal (a port 202C).

The second card slot 203 is configured to assemble the second physical SIM card. The second card slot 203 includes three input terminals, which are a port for transmitting a data signal (a port 203A), a port for transmitting a reset signal (a port 203B), and a port for transmitting a clock signal (a port 203C).

It may be understood that the first physical SIM card may be a Nano SIM card, a Micro SIM card, and the like; and the second physical SIM card may be a Nano SIM card, a Micro SIM card, and the like, which are not limited in the embodiment of this application. A specification of the first physical SIM card may be the same as or different from a specification of the second physical SIM card, which is not limited by embodiments of this application.

The ESIM chip 204 includes three input terminals, which are a port for transmitting a data signal (a port 204A), a port for transmitting a reset signal (a port 204B), and a port for transmitting a clock signal (a port 204C). The ESIM chip 204 may be an SN110U chip or an SN220U chip. Embodiment of this application do not limit a specific model, a specification, and the like of the ESIM chip 204.

The first switch 205 is configured to connect the processor 201 and the second card slot 203 to implement connection between the processor 201 and the second physical SIM card; or to connect the processor 201 and the ESIM chip 204 to implement connection between the processor 201 and the ESIM card. The first switch 205 may be referred to as a switch unit.

The processor 201 is configured to interact with a communication network through any one of the first physical SIM card, the second physical SIM card, and the ESIM card to implement functions such as call and data communication of the terminal device.

In an embodiment of this application, the processor 201 may be a system on chip (system on chip, SOC), a micro control unit (micro control unit, MCU), or the like. The processor may also be referred to as a controller. A specific structure of the processor 201 is not limited in embodiments of this application.

In an embodiment of this application, the processor 201 includes two sets of SIM interfaces, which are respectively configured to connect the first card slot 202, and connect the second card slot 203 or the ESIM chip 204. Each set of SIM interfaces includes three ports, which are a port for transmitting a data signal (may be referred to as a DATA port and an I/O port), a port for transmitting a reset signal (may be referred to as an RST port and a RESET port), and a port for transmitting a clock signal (may be referred to as a CLK port).

Specifically, the processor 201 includes two sets of SIM interfaces. One set of SIM interfaces includes a port DATA1, a port RST1, and a port CLK1; and the other set of SIM interfaces includes a port DATA2, a port RST2, and port CLK2.

In an embodiment of this application, the port DATA1, the port RST1, and the port CLK1 are respectively connected to the three ports (the port 202A, the port 202B, and the port 202C) of the first card slot 202, to implement connection between the processor 201 and the first physical SIM card; and the port DATA2, the port RST2, and the port CLK2 are respectively connected to the three input terminals of the first switch 205.

The first switch 205 includes three input terminals and six output terminals. The three input terminals of the first switch 205 are a port 205A, a port 205B, and a port 205C. The six output terminals of the first switch 205 are a port 205D, a port 205E, a port 205F, a port 205G, a port 205H, and a port 205I, respectively.

It may be understood that the port 205D, the port 205E, and the port 205F may be referred to as the first output terminal of the first switch 205, or may be referred to as the first output terminal of the switch unit. The port 205G, the port 205H, and the port 205I may be referred to as a second output terminal of the first switch 205, or may be referred to as a second output terminal of the switch unit.

It may be understood that the first switch 205 may be a two-out-of-three switch, a three-channel switch, a triple-pole double-throw switch, or a switch of another type, which is not limited by embodiments of this application.

As shown in FIG. 2, the port 205D, the port 205E, and the port 205F in the first switch 205 are respectively connected to the three ports (the port 203A, the port 203B, and the port 203C) of the second card slot 203, to implement connection between the processor and the second physical SIM card; and the port 205G, the port 205H, and the port 205I in the first switch 205 are respectively connected to the three ports (the port 204A, the port 204B, and the port 204C) of the ESIM chip 204, to implement connection between the processor and the ESIM card.

It may be understood that the output terminals of the first switch 205 in FIG. 2 are arranged in an order of the port 205D, the port 205E, the port 205F, the port 205G, the port 205H, and the port 205I, respectively. The output terminals of the first switch 205 may also be arranged in an order of the port 205D, the port 205G, the port 205E, the port 205H, the port 205F, and the port 205I, respectively. Embodiments of this application does not limit the arrangement order of the output terminals in the first switch 205. Similarly, the arrangement order of the ports in another device shown in FIG. 2 may also be replaced, which is not limited here.

The possible connection of the first switch 205 in FIG. 2 is described below with reference to FIG. 3 and FIG. 4.

Figure 3:
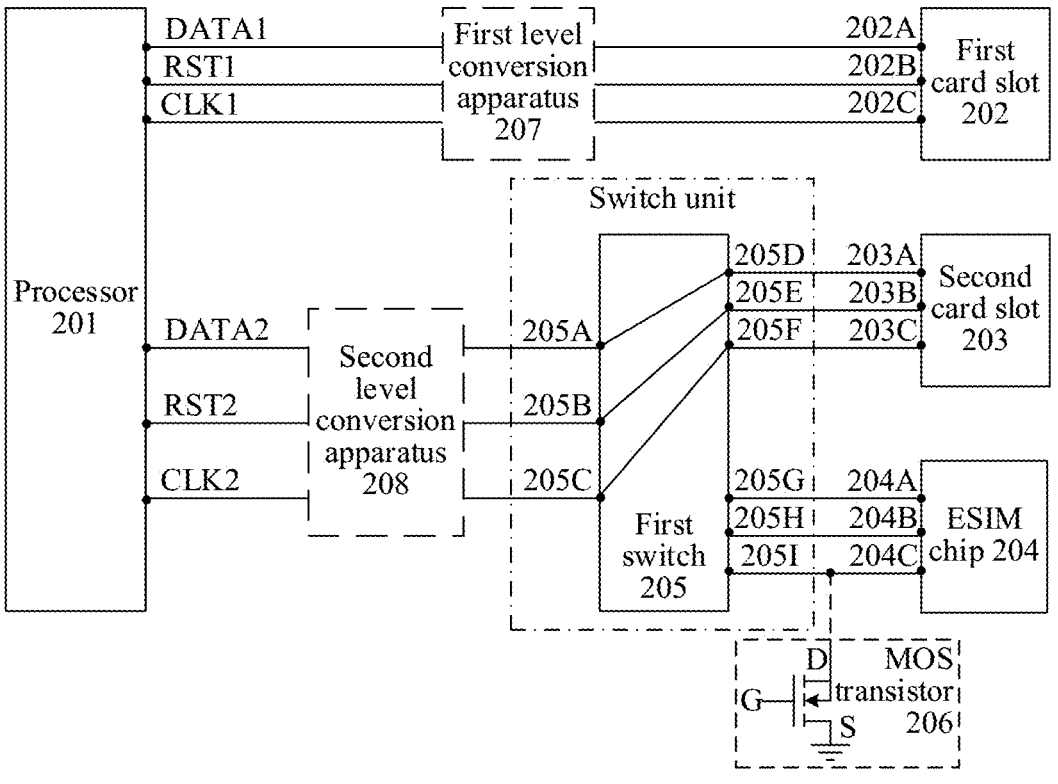
FIG. 3 is a schematic diagram of connection of a circuit according to an embodiment of this application.

For example, FIG. 3 is a schematic structural diagram of a processor when communicating with a second physical SIM card according to an embodiment of this application. As shown in FIG. 3, the port 205A, the port 205B, and the port 205C in the first switch 205 are respectively connected to the port 205D, the port 205E, and the port 205F in the first switch 205.

In an embodiment of this application, the processor 201 transmits the DATA signal to the second physical SIM card in the second card slot through the port DATA2, the port 205A, the port 205D, and the port 203A; the processor 201 transmits the RST signal to the second physical SIM card in the second card slot through the port RST2, the port 205B, the port 205E, and the port 203B; and the processor 201 transmits the CLK signal to the second physical SIM card in the second card slot through the port CLK2, the port 205C, the port 205F, and the port 203C.

In this way, the terminal device may realize communication between the processor and the second physical SIM card.

Figure 4:
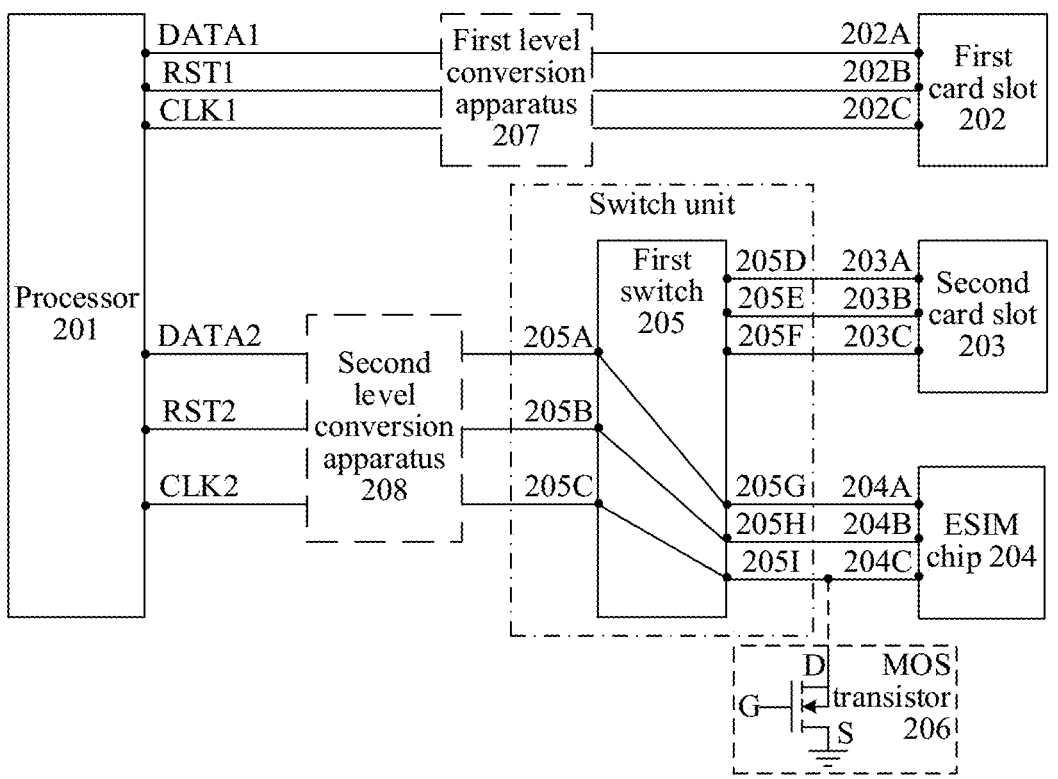
FIG. 4 is a schematic diagram of connection of a circuit according to an embodiment of this application.

For example, FIG. 4 is a schematic structural diagram of a processor when communicating with an ESIM card according to an embodiment of this application. As shown in FIG. 4, the port 205A, the port 205B, and the port 205C in the first switch 205 are respectively connected to the port 205G, the port 205H, and the port 205I in the first switch 205.

In an embodiment of this application, the processor 201 transmits the DATA signal to the ESIM card in the ESIM chip through the port DATA2, the port 205A, the port 205G, and the port 204A; the processor 201 transmits the RST signal to the ESIM card in the ESIM chip through the port RST2, the port 205B, the port 205H, and the port 204B; and the processor 201 transmits the CLK signal to the ESIM card in the ESIM chip through the port CLK2, the port 205C, the port 205I, and the port 204B.

In this way, the terminal device may realize communication between the processor and the ESIM card. By changing the connection manner of the first switch, the switching of the second physical SIM card and the ESIM card is implemented, and practicability and applicability of the terminal device are increased. In addition, the processor is not changed, circuits without and with the ESIM chip can use a same processor, and such a common layout can reduce difficulty of material preparation for the processor and reduce the production cost.

It should be noted that the above ESIM chip 204 may be an independent chip or may be integrated with another chip. For example, the ESIM chip 204 may be integrated with an NFC chip in the terminal device. In this way, the occupancy of a printed circuit board (PCB board) can be reduced and a volume of the terminal device can be reduced. In addition, the NFC function corresponding to the NFC chip involves payment, and the like, which has high security performance and can also meet security performance requirements of the ESIM card.

It should be noted that when the ESIM chip can be integrated with the NFC chip and the ESIM chip does not operate, a voltage at the input terminal configured to transmit the CLK signal may be relatively high, so that the NFC chip cannot enter a low power consumption mode. Therefore, when the ESIM chip does not operate, the input terminal configured to transmit the CLK signal is maintained at a low level.

In a possible implementation I, the input terminal configured to transmit the CLK signal in the switch unit and the ESIM chip is connected to a metal oxide semiconductor field effect transistor (metal oxide semiconductor field effect transistor, MOS transistor).

Specifically, when the processor communicates with the second physical SIM card, the MOS transistor is configured to maintain the input terminal configured to transmit the CLK signal on an ESIM chip side at a low level. In this way, when the ESIM card does not operate, the input terminal configured to transmit the CLK signal can be pulled low, so that the NFC chip can enter the low power consumption mode and reduce the power consumption of the terminal device.

When the processor communicates with the ESIM card, the MOS transistor is turned off, which does not affect the transmission of the CLK signal and does not affect the communication between the processor and the ESIM card.

It may be understood that the MOS transistor may be an N-type MOS transistor or a P-type MOS transistor. A specific structure, model, and the like of the MOS transistor are not limited in embodiments of this application.

For example, as shown in FIG. 2, the SIM card communication circuit further includes a MOS transistor 206. The MOS transistor 206 is located between the port 205I of the first switch 205 and the input terminal (the port 204C) in the ESIM chip configured to transmit the CLK signal.

That the MOS transistor 206 is the N-type MOS transistor is used as an example. A drain (drain, D) of the MOS transistor is connected to the port 205I of the first switch 205, a source (source, S) of the MOS transistor is grounded, and a gate (gate, G) of the MOS transistor is connected to the processor.

When the terminal device selects the ESIM card for communication, the processor controls a gate voltage of the MOS transistor 206 to increase (such as to increase to 1.8 V), and the MOS transistor 206 is turned on. In this way, the MOS transistor 206 maintains the input terminal (the port 204C) configured to transmit the CLK signal on the ESIM chip side at a low level. Further, when the ESIM card does not operate, the input terminal configured to transmit the CLK signal is pulled low, so that the NFC chip can enter the low power consumption mode, reducing the power consumption of the terminal device.

When the terminal device selects the second physical SIM card for communication, the processor controls a gate voltage of the MOS transistor 206 to decrease (such as to decrease to 0 V) and the MOS transistor 206 turns off. In this way, when the processor communicates with the ESIM card, the MOS transistor 206 does not affect the transmission of the CLK signal.

Figure 5:
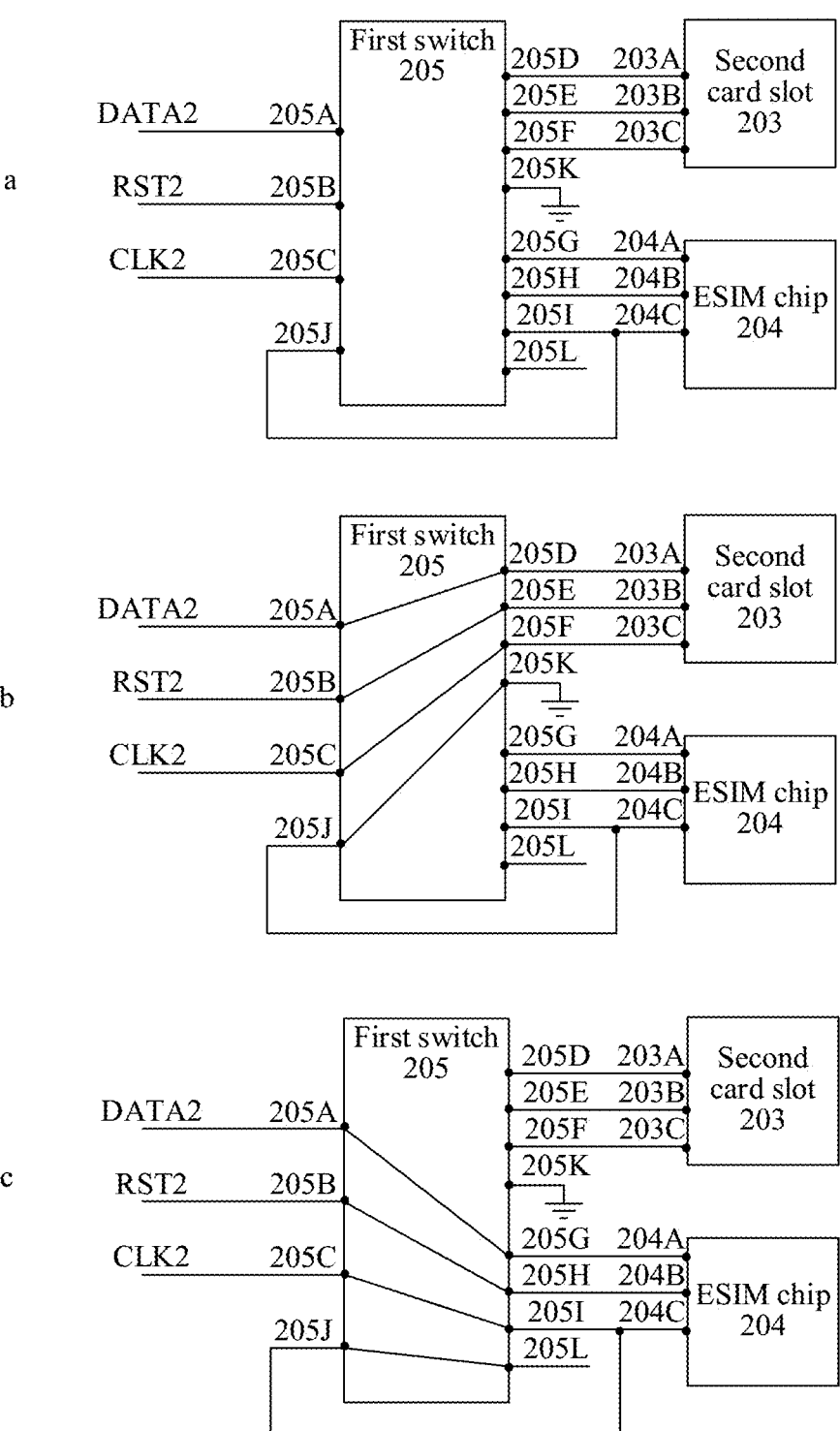
FIG. 5 is a schematic diagram of a structure of a first switch according to an embodiment of this application.

In a possible implementation II, the first switch 205 further includes a 205J port, a 205K port, and a port 205L (as shown in a in FIG. 5). The 205J port in the first switch 205 is connected to the port 205I in the first switch 205 from the outside of the first switch. The 205K port is grounded. The port 205L is open-circuited.

Specifically, when the processor communicates with the second physical SIM card in the second card slot, the 205J port in the first switch 205 is connected to the 205K port in the first switch 205 (as shown in b in FIG. 5). In this way, when the ESIM chip does not operate, the input terminal (the port 204C) configured to transmit the CLK signal in the ESIM chip is grounded through the port 205I, the port 205J, and the port 205K, and is maintained at a low level, so that the NFC chip can also enter the low power consumption mode when the ESIM chip is integrated with the NFC.

When the processor communicates with the ESIM card in the second card slot, the 205J port in the first switch 205 is connected to the port 205L in the first switch 205, and the port 205L is open-circuited (as shown in c in FIG. 5), which does not affect communication between the processor and the ESIM card.

The first switch may be a two-out-of-four switch, a four-channel switch, or a four-pole double-throw switch, which is not limited here.

In a possible implementation, the circuit shown in FIG. 2 further includes a first level conversion apparatus 207, and/or a second level conversion apparatus 208.

The first level conversion apparatus 207 is located between the processor 201 and the first card slot 202. The first level conversion apparatus 207 is configured to convert the voltage to realize communication between the voltage specification of the processor 201 and the voltage specification of the first physical SIM card in the first card slot 202.

It may be understood that the physical SIM card includes a plurality of types. An operating voltage corresponding to each type of physical SIM card may be different. For example, an operating voltage corresponding to the Nano SIM card is 3 V, and the operating voltage corresponding to the Micro SIM card is 1.8 V.

In this way, the communication between the processor 201 and the first physical SIM card in the first card slot 202 at different voltage specifications or the same voltage specification can be implemented through the first level conversion apparatus 207. The first card slot may be adapted to assemble different types of SIM cards, increasing practicality and applicability of the terminal device.

The second level conversion apparatus 208 is located between the processor 201 and the first switch 205. The second level conversion apparatus 208 is configured to convert voltages to realize communication between the processor 201 and the second physical SIM card in the second card slot 203 at different voltage specifications or the same voltage specification. The second card slot may be adapted to assemble different types of SIM cards, increasing practicality and applicability of the terminal device.

It may be understood that the SIM card communication circuit in FIG. 2 to FIG. 5 is described by using two sets of SIM interfaces as an example. In some embodiments, the processor may only one set of SIM interfaces. When the processor includes only one set of SIM interfaces, none of the circuits shown in FIG. 2 to FIG. 5 include the first card slot and the port connected to the first card slot (for example, a port DATA1 in the processor, a port RST1, and a port CLK1).

The embodiment shown in FIG. 2 to FIG. 5 is described by using the switch unit including one switch as an example; and a case that the switch unit includes two switches is described below in conjunction with FIG. 6 to FIG. 11. The switch may also be referred to as an analog switch.

Figure 6:
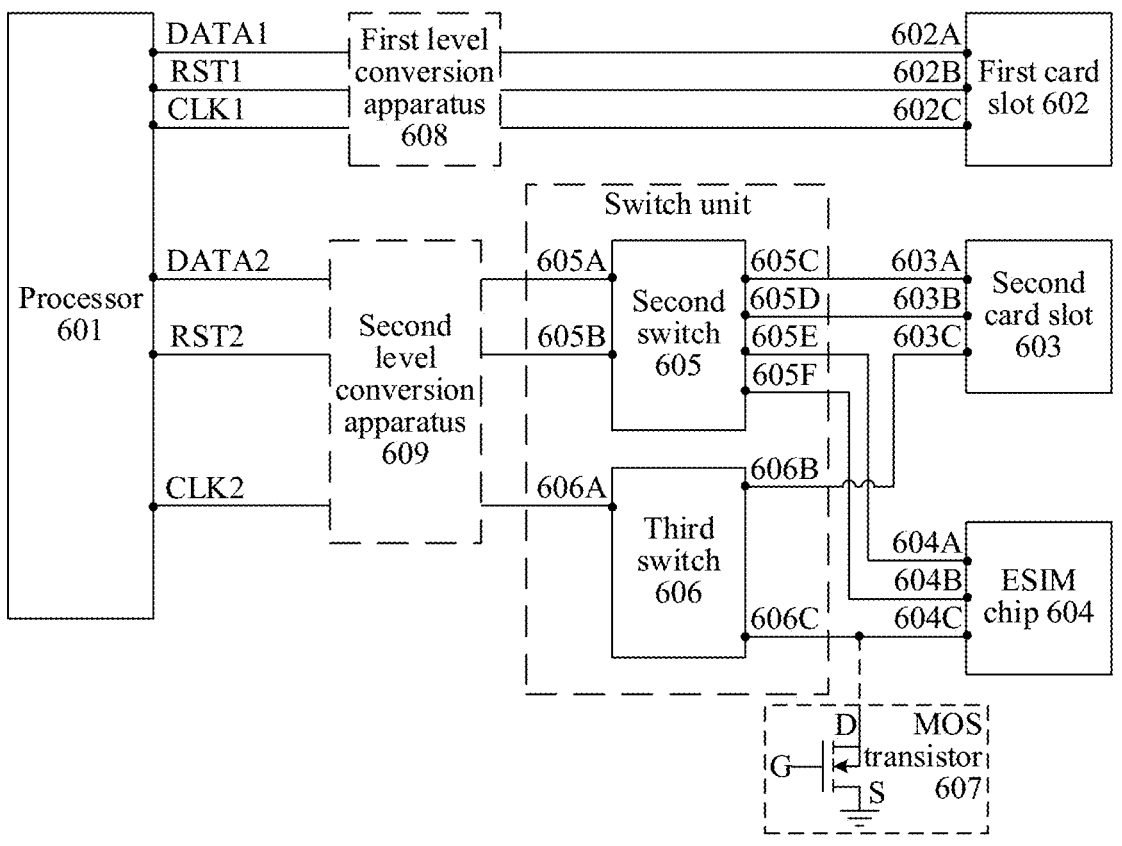
FIG. 6 is a schematic structural diagram of a circuit structure according to an embodiment of this application.

FIG. 6 is a schematic structural diagram of a SIM card communication circuit according to an embodiment of this application. As shown in FIG. 6, the circuit includes a processor 601, a first card slot 602, a second card slot 603, an ESIM chip 604, a second switch 605, and a third switch 606. In the circuit shown in FIG. 6, a SIM interface of the processor 601 is respectively connected to the first card slot 602, an input terminal of the second switch 605, and an input terminal of the third switch 606; a first output terminal of the second switch 605 and a first output terminal of the third switch 606 are both connected to the second card slot 603; and a second output terminal of the second switch 605 and a second output terminal of the third switch 606 are both connected to the ESIM chip 604.

The first card slot 602 is configured to assemble the first physical SIM card. The first card slot 602 includes three input terminals, which are a port for transmitting a data signal (a port 602A), a port for transmitting a reset signal (a port 602B), and a port for transmitting a clock signal (a port 602C).

The second card slot 603 is configured to assemble the second physical SIM card. The second card slot 603 includes three input terminals, which are a port for transmitting a data signal (a port 603A), a port for transmitting a reset signal (a port 603B), and a port for transmitting a clock signal (a port 603C).

It may be understood that the first physical SIM card may be a Nano SIM card, a Micro SIM card, and the like; and the second physical SIM card may be a Nano SIM card, a Micro SIM card, and the like, which are not limited in the embodiment of this application. A specification of the first physical SIM card may be the same as or different from a specification of the second physical SIM card, which is not limited by embodiments of this application.

The ESIM chip 604 includes three input terminals, which are a port for transmitting a data signal (a port 604A), a port for transmitting a reset signal (a port 604B), and a port for transmitting a clock signal (a port 604C). The ESIM chip 604 may be an SN110U chip or an SN220U chip. Embodiment of this application do not limit a specific model, a specification, and the like of the ESIM chip 604.

The second switch 605 and the third switch 606 are configured to connect the processor 601 and the second card slot 603 to implement connection between the processor and the second physical SIM card; or to connect the processor 601 and the ESIM chip 604 to implement connection between the processor and the ESIM card.

The second switch 605 and the third switch 606 may be collectively referred to as the switch unit.

The processor 601 is configured to interact with a communication network through any one of the first physical SIM card, the second physical SIM card, and the ESIM card to implement functions such as call and data communication of the terminal device.

In an embodiment of this application, the processor 601 may be a system on chip (system on chip, SOC), a micro control unit (micro control unit, MCU), or the like. The processor may also be referred to as a controller. A specific structure of the processor 601 is not limited in embodiments of this application.

In an embodiment of this application, the processor 601 includes two sets of SIM interfaces, which are respectively configured to connect the first card slot 602, and connect the second card slot 603 or the ESIM chip 604. Each set of SIM interfaces includes three ports, which are a port for transmitting a data signal (may be referred to as a DATA port and an I/O port), a port for transmitting a reset signal (may be referred to as an RST port and a RESET port), and a port for transmitting a clock signal (may be referred to as a CLK port).

Specifically, the processor 601 includes two sets of SIM interfaces. One set of SIM interfaces includes a port DATA1, a port RST1, and a port CLK1; and the other set of SIM interfaces includes a port DATA2, a port RST2, and port CLK2.

In an embodiment of this application, the port DATA1, the port RST1, and the port CLK1 are respectively connected to the three ports (the port 602A, the port 602B, and the port 602C) of the first card slot 602; and the port DATA2, the port RST2, and the port CLK2 are respectively connected to two input terminals of the second switch 605 and one input terminal of the third switch 606.

In an embodiment of this application, the second switch 605 includes two input terminals and four output terminals. The two input terminals of the second switch 605 are a port 605A and a port 605B. The four output terminals of the second switch 605 are a port 605C, a port 605D, a port 605E, and a port 605F, respectively. The port 605C and the port 605D may be referred to as the first output terminal of the second switch 605; and the port 605E and the port 605F may be referred to as the second output terminal of the second switch 605.

The third switch 606 includes one input terminal and two output terminals. The one input terminal of the third switch 606 is a port 606A. The two output terminals of the third switch 606 are a port 606B and a port 606C, respectively. The port 606B may be referred to as a first output terminal of the third switch 606; and the port 606C may be referred to as a second output terminal of the third switch 606.

It may be understood that the port 605C, the port 605D, and the port 606B may also be referred to as the first output terminals of the switch unit. The port 605E, the port 605F, and the port 606C may also be referred to as the second output terminals of the switch unit.

It may be understood that the second switch 605 may be a two-out-of-two switch, a dual-channel switch, a double-pole double-throw switch (or a DPDT switch), or a switch of another type, which is not limited by embodiments of this application. The third switch 606 may be a two-out-of-one switch, a single-channel switch, a single-pole double-throw switch (or an SPDT switch), or a switch of another type, which is not limited by embodiments of this application.

As shown in FIG. 6, the port DATA2, the port RST2, and the port CLK2 are respectively connected to the port 605A, the port 605B of the second switch 605, and the port 606A of the third switch 606; the port 605C and the port 605D of the second switch 605, and the port 606B of the third switch 606 are respectively connected to the three ports (the port 603A, the port 603B, and the port 603C) of the second card slot 603, to implement connection between the processor and the second physical SIM card; and the port 605E and the port 605F of the second switch 605, and the port 606C of the third switch 606 are respectively connected to the three ports (the port 604A, the port 604B, and the port 604C) of the ESIM chip 604, to implement connection between the processor and the ESIM card.

The possible connection of the second switch 605 and the third switch 606 is described below with reference to FIG. 7 and FIG. 8.

Figure 7:
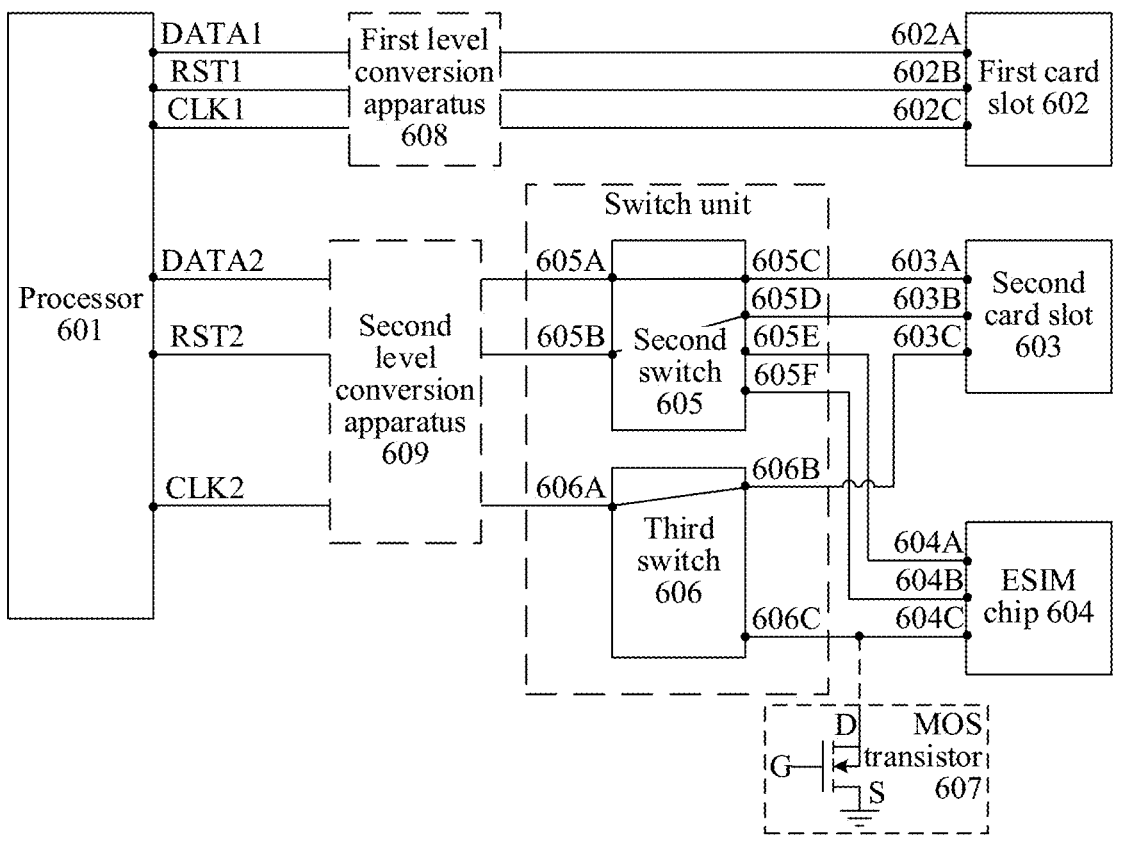
FIG. 7 is a schematic diagram of connection of a circuit according to an embodiment of this application;

For example, FIG. 7 is a schematic structural diagram of a processor when communicating with a second physical SIM card according to an embodiment of this application. As shown in FIG. 7, a port 605A and a port 605B in the second switch 605 are respectively connected to the port 605C and the port 605D in the second switch 605; and a port 605A in the third switch 606 is connected to a port 605B in the third switch 606.

In an embodiment of this application, the processor 601 transmits the DATA signal to the second physical SIM card in the second card slot through the port DATA2, the port 605A, the port 605C, and the port 603A; the processor 601 transmits the RST signal to the second physical SIM card in the second card slot through the port RST2, the port 605B, the port 605D, and the port 603B; and the processor 601 transmits the CLK signal to the second physical SIM card in the second card slot through the port CLK2, the port 606A, the port 606B, and the port 603C.

In this way, the terminal device may realize communication between the processor and the second physical SIM card.

Figure 8:
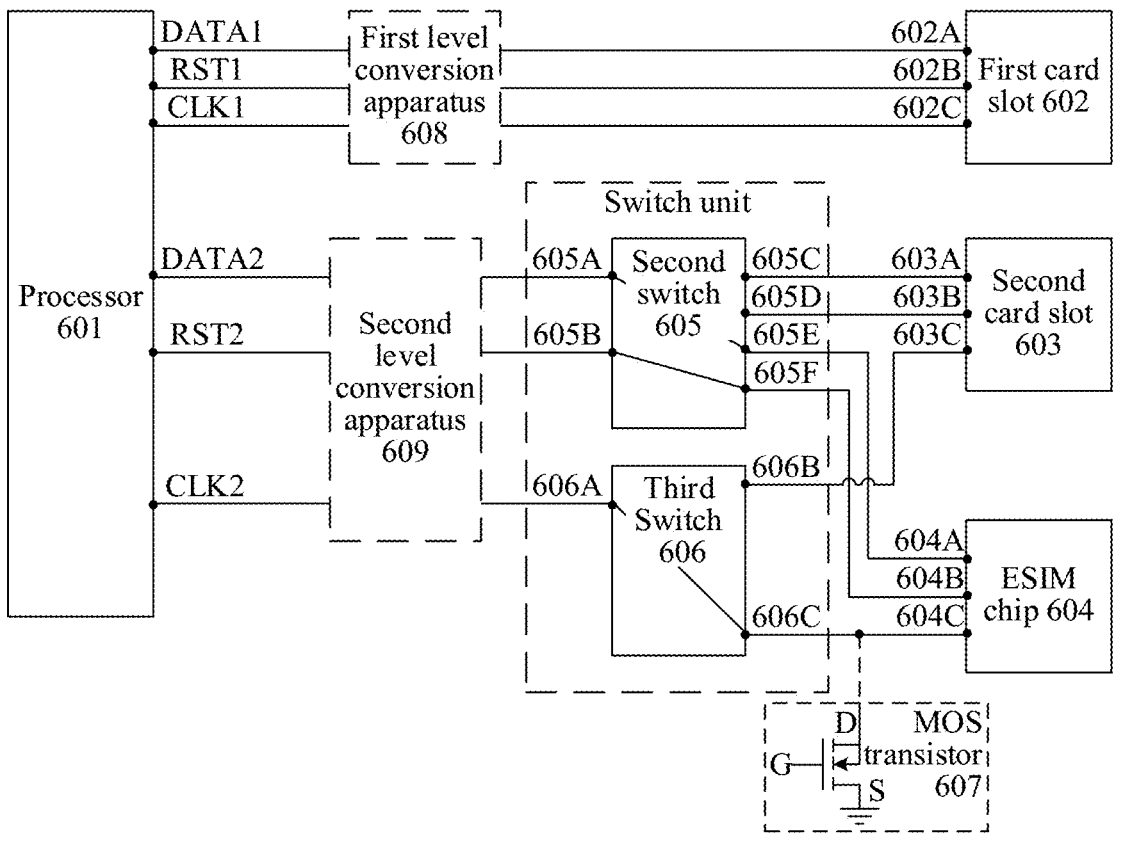
FIG. 8 is a schematic diagram of connection of a circuit according to an embodiment of this application.

For example, FIG. 8 is a schematic structural diagram of a processor when communicating with an ESIM card according to an embodiment of this application. As shown in FIG. 8, a port 605A and a port 605B in the second switch 605 are respectively connected to the port 605E and the port 605F in the second switch 605; and a port 605A in the third switch 606 is connected to a port 606C in the third switch 606.

In an embodiment of this application, the processor 601 transmits the DATA signal to the ESIM card in the ESIM chip through the port DATA2, the port 605A, the port 605E, and the port 604A; the processor 601 transmits the RST signal to the ESIM card in the ESIM chip through the port RST2, the port 605B, the port 605F, and the port 604B; and the processor 601 transmits the CLK signal to the ESIM card in the ESIM chip through the port CLK2, the port 606A, the port 606C, and the port 604C.

In this way, the terminal device may realize communication between the processor and the ESIM card. By changing the connection manner of the second switch and the connection manner of the third switch, the switching of the second physical SIM card and the ESIM card is implemented, and practicability and applicability of the terminal device are increased. In addition, the processor is not changed, circuits without and with the ESIM chip can use a same processor, and such a common layout can reduce difficulty of material preparation for the processor and reduce the production cost.

In addition, compared with the first switch shown in FIG. 2, the second switch and the third switch shown in FIG. 6 have strong multiplexing and a low cost.

It may be understood that, in the circuit shown in FIG. 6 above, the second switch 605 is configured to transmit the DATA signal and the RST signal, and the third switch 606 is configured to transmit the CLK signal.

In some embodiments, the second switch 605 is configured to transmit the CLK signal and the RST signal, and the third switch 606 is configured to transmit the DATA signal. For example, the port DATA2, the port RST2, and the port CLK2 may also be connected to the port 606A of the third switch 606, and the port 605A and the port 605B of the second switch 605, respectively; the port 606B of the third switch 606, and the port 605C and the port 605D of the second switch 605 are respectively connected to the three ports (the port 603A, the port 603B, and the port 603C) of the second card slot 603; and the port 606C of the third switch 606, and the port 605E and the port 605F of the second switch 605 are respectively connected to the three ports (the port 604A, the port 604B, and the port 604C) of the ESIM chip 604.

In some embodiments, the second switch 605 is configured to transmit the DATA signal and the CLK signal, and the third switch 606 is configured to transmit the RST signal. The port DATA2, the port RST2, and the port CLK2 may also be respectively connected to the port 605A of second switch 605, the port 606A of third switch 606, and the port 605B of second switch 605; the port 605C of the second switch 605, the port 606B of the third switch 606, and the port 605D of the second switch 605 are respectively connected to the three ports (the port 603A, the port 603B, and the port 603C) of the second card slot 603; and the port 605E of the second switch 605, the port 606C of the third switch 606, and the port 605F of the second switch 605 are respectively connected to the three ports (the port 604A, the port 604B, and the port 604C) of the ESIM chip 604.

Embodiments of this application do not limit the specific corresponding connection conditions of the port DATA2, the port RST2, the port CLK2, and the respective ports in the switch unit in the processor.

It may be understood that the arrangement order of the ports in each component in FIG. 6 may also be replaced, and embodiments of this application do not limit ordering and position of the ports in each component in FIG. 6.

It should be noted that the above ESIM chip 604 may be an independent chip or may be integrated with another chip.

For example, the ESIM chip 604 may be integrated with an NFC chip in the terminal device. In this way, the occupancy of a printed circuit board (PCB board) can be reduced and a volume of the terminal device can be reduced. In addition, the NFC function corresponding to the NFC chip involves payment, and the like, which has high security performance and can also meet security performance requirements of the ESIM card.

In a possible implementation, the MOS transistor is included between the switch unit and the input terminal configured to transmit the CLK signal in the ESIM chip. Specifically, when the processor communicates with the second physical SIM card, the MOS transistor is configured to maintain the input terminal configured to transmit the CLK signal on an ESIM chip side at a low level. In this way, when the ESIM card does not operate, the input terminal configured to transmit the CLK signal can be pulled low, so that the NFC chip can enter the low power consumption mode and reduce the power consumption of the terminal device.

When the processor communicates with the ESIM card, the MOS transistor is turned off, which does not affect the transmission of the CLK signal and does not affect the communication between the processor and the ESIM card.

It may be understood that the MOS transistor may be an N-type MOS transistor or a P-type MOS transistor. A specific structure, model, and the like of the MOS transistor are not limited in embodiments of this application.

For example, as shown in FIG. 6, the SIM card communication circuit further includes a MOS transistor 607. The MOS transistor 607 is located between the port 606C of the third switch 606 and the input terminal (the port 604C) in the ESIM chip for transmitting the CLK signal.

That the MOS transistor 607 is the N-type MOS transistor is used as an example. A drain (drain, D) of the MOS transistor is connected to the port 606C of the third switch 606, a source (source, S) of the MOS transistor is grounded, and a gate (gate, G) of the MOS transistor is connected to the processor.

When the terminal device selects the ESIM card for communication, the processor controls a gate voltage of the MOS transistor 607 to increase (such as to increase to 1.8 V), and the MOS transistor 607 is turned on. In this way, the MOS transistor 607 maintains the input terminal (the port 607C) configured to transmit the CLK signal on the ESIM chip side at a low level. Further, when the ESIM card does not operate, the input terminal configured to transmit the CLK signal can be pulled low, so that the NFC chip can enter the low power consumption mode and reduce the power consumption of the terminal device.

When the terminal device selects the second physical SIM card for communication, the processor controls a gate voltage of the MOS transistor 607 to decrease (such as to decrease to 0 V) and the MOS transistor 607 turns off. In this way, when the processor communicates with the ESIM card, the MOS transistor 607 does not affect the transmission of the CLK signal.

Figure 9:
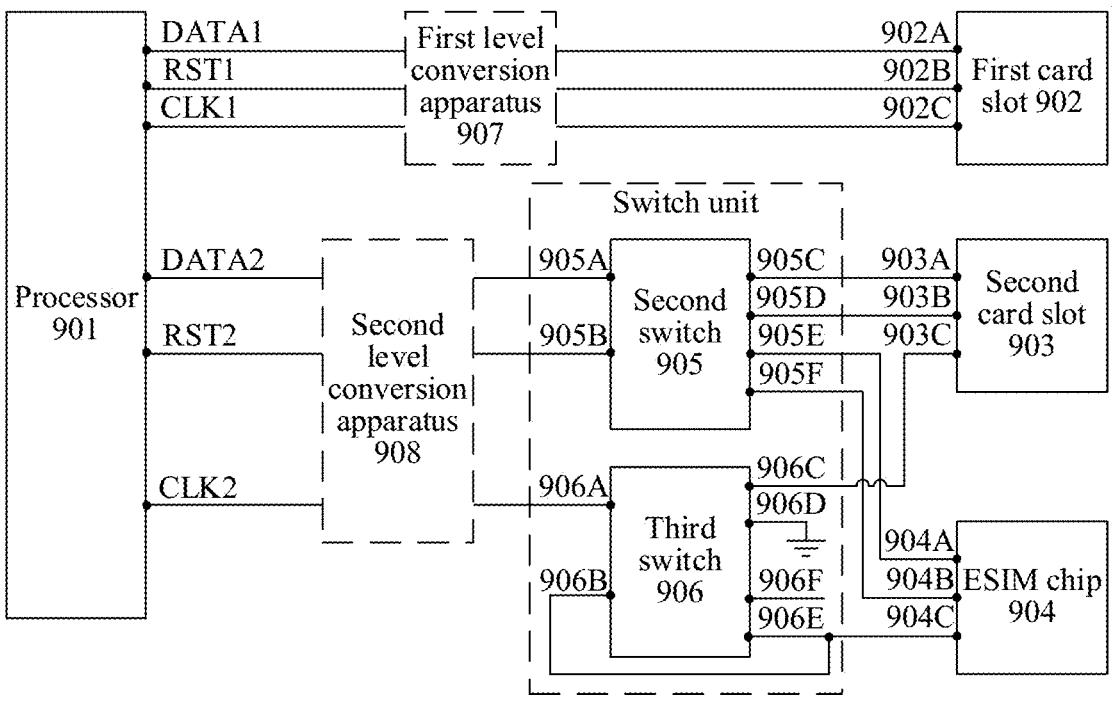
FIG. 9 is a schematic structural diagram of a circuit structure according to an embodiment of this application.

FIG. 9 is a schematic structural diagram of a SIM card communication circuit according to an embodiment of this application. As shown in FIG. 9, the circuit includes a processor 901, a first card slot 902, a second card slot 903, an ESIM chip 904, a second switch 905, and a third switch 906. In the circuit shown in FIG. 9, a SIM interface of the processor 901 is respectively connected to the first card slot 902, an input terminal of the second switch 905, and an input terminal of the third switch 906; a first output terminal of the second switch 905 and a first output terminal of the third switch 906 are both connected to the second card slot 903; and a second output terminal of the second switch 905 and a second output terminal of the third switch 906 are both connected to the ESIM chip 904.

Functions and structures of the processor 901, the first card slot 902, the second card slot 903, and the ESIM chip 904 may be described with reference to the corresponding components in FIG. 2 and FIG. 6. Details are not described herein.

The second switch 905 and the third switch 906 are configured to connect the processor 901 and the second card slot 903 to implement connection between the processor and the second physical SIM card; or to connect the processor 901 and the ESIM chip 904 to implement connection between the processor and the ESIM card.

The second switch 905 and the third switch 906 may be collectively referred to as the switch unit.

In an embodiment of this application, the second switch 905 includes two input terminals and four output terminals. The two input terminals of the second switch 905 are a port 905A and a port 905B. The four output terminals of the second switch 905 are a port 905C, a port 905D, a port 905E, and a port 905F, respectively. The port 905C and the port 905D may be referred to as the first output terminal of the second switch 905; and the port 905E and the port 905F may be referred to as the second output terminal of the second switch 905.

The third switch 906 includes two input terminals and four output terminals. The two input terminals of the third switch 906 are a port 906A and a port 906B. The four output terminals of the third switch 906 are a port 906C, a port 906D, a port 906E, and a port 906F, respectively. The port 906C may be referred to as a first output terminal of the third switch 906; and the port 906E may be referred to as a second output terminal of the third switch 906.

It may be understood that the port 905C, the port 905D, and the port 906C may also be referred to as the first output terminals of the switch unit. The port 905E, the port 905F, and the port 906E may also be referred to as the second output terminals of the switch unit.

It may be understood that the second switch 905 may be a two-out-of-two switch, a dual-channel switch, a double-pole double-throw switch, or a switch of another type, which is not limited by embodiments of this application. The third switch 906 may be a two-out-of-two switch, a dual-channel switch, a double-pole double-throw switch, or a switch of another type, which is not limited by embodiments of this application.

As shown in FIG. 9, the port DATA1, the port RST1, and the port CLK1 are respectively connected to the three ports (the port 902A, the port 902B, and the port 902C) of the first card slot 902; and the port DATA2, the port RST2, and the port CLK2 are respectively connected to the port 905A, the port 905B of the second switch 905, and the port 906A of the third switch 906. The port 905C and the port 905D of the second switch 905, and the port 906C of the third switch 906 are respectively connected to the three ports (the port 903A, the port 903B, and the port 903C) of the second card slot 903, to implement connection between the processor and the second physical SIM card; the port 905E and the port 905F of the second switch 905, and the port 906E of the third switch 906 are respectively connected to the three ports (the port 904A, the port 904B, and the port 904C) of the ESIM chip 904, to implement connection between the processor and the ESIM card; and The port 906B of the third switch 906 is connected to the port 906E from the outside. The port 906D of the third switch 906 is grounded.

The possible connection of the second switch 905 and the third switch 906 is described below with reference to FIG. 10 and FIG. 11.

Figure 10:
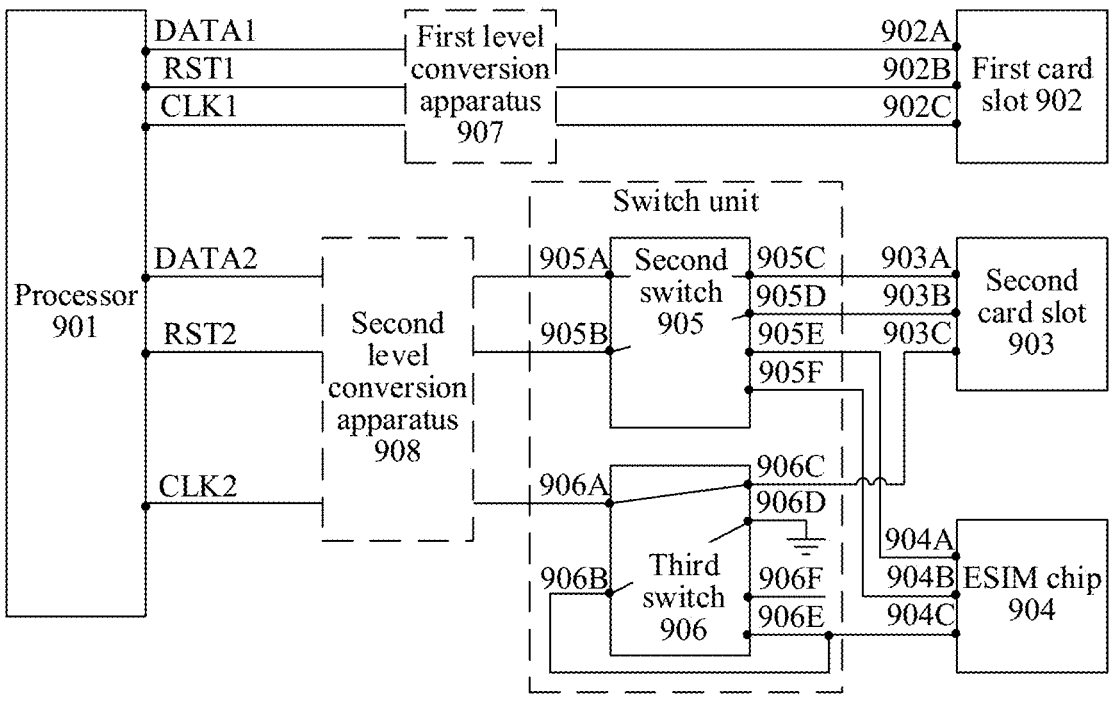
FIG. 10 is a schematic diagram of connection of a circuit 55 according to an embodiment of this application.

For example, FIG. 10 is a schematic structural diagram of a processor when communicating with a second physical SIM card according to an embodiment of this application. As shown in FIG. 10, a port 905A and a port 905B in the second switch 905 are respectively connected to the port 905C and the port 905D in the second switch 905; and a port 905A and a port 905B in the third switch 906 are respectively connected to the port 905C and the port 906D in the third switch 906.

In an embodiment of this application, the processor 901 transmits the DATA signal to the second physical SIM card in the second card slot through the port DATA2, the port 905A, the port 905C, and the port 903A; the processor 901 transmits the RST signal to the second physical SIM card in the second card slot through the port RST2, the port 905B, the port 905D, and the port 903B; and the processor 901 transmits the CLK signal to the second physical SIM card in the second card slot through the port CLK2, the port 906A, the port 906C, and the port 903C.

In this way, the terminal device may realize communication between the processor and the second physical SIM card.

In this way, when the processor communicates with the second physical SIM card, the input terminal configured to transmit the CLK signal in the ESIM chip is grounded through the port 906E, the port 906B, and the port 905E in the third switch 906 and is maintained at a low level, so that the NFC chip can also enter the low power consumption mode when the ESIM chip is integrated with the NFC.

Figure 11:
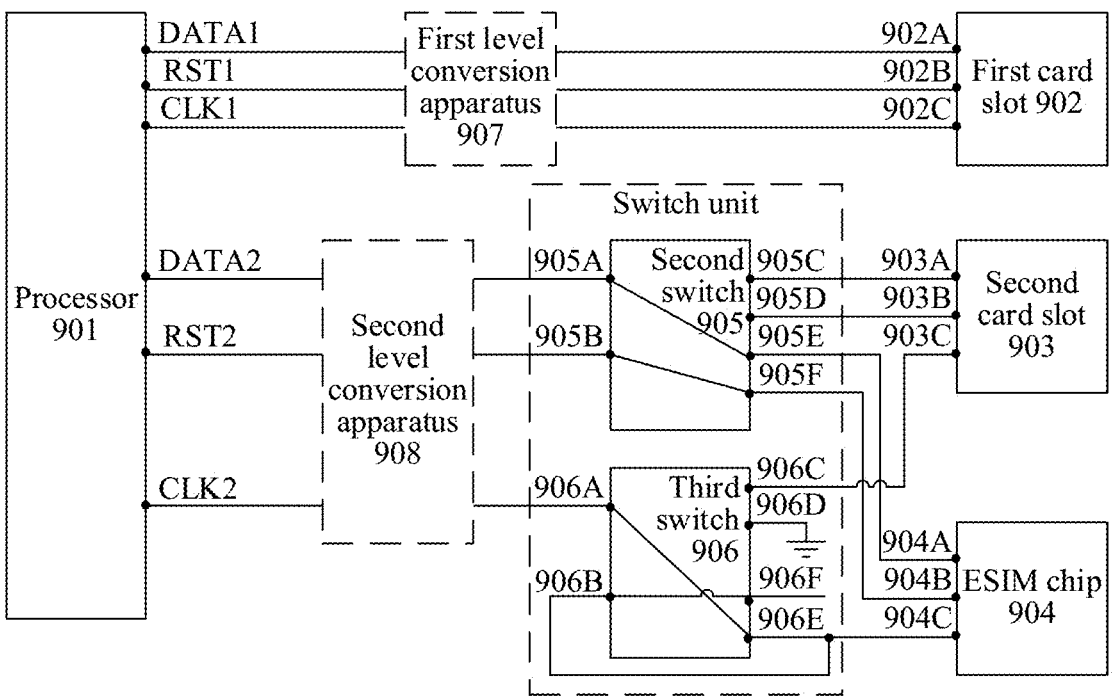
FIG. 11 is a schematic diagram of connection of a circuit according to an embodiment of this application.

For example, FIG. 11 is a schematic structural diagram of a processor when communicating with an ESIM card according to an embodiment of this application. As shown in FIG. 11, a port 905A and a port 905B in the second switch 905 are respectively connected to the port 905E and the port 905F in the second switch 905; and a port 905A in the third switch 906 is connected to a port 906C in the third switch 906.

In an embodiment of this application, the processor 901 transmits the DATA signal to the ESIM card in the ESIM chip through the port DATA2, the port 905A, the port 905E, and the port 904A; the processor 901 transmits the RST signal to the ESIM card in the ESIM chip through the port RST2, the port 905B, the port 905F, and the port 904B; and the processor 901 transmits the CLK signal to the ESIM card in the ESIM chip through the port CLK2, the port 906A, the port 906E, and the port 904C.

In this way, the terminal device may realize communication between the processor and the ESIM card. By changing the connection manner of the first switch, the switching of the second physical SIM card and the ESIM card is implemented, and practicability and applicability of the terminal device are increased. In addition, the processor is not changed, which can reduce difficulty of preparing the processor and reduce the production cost.

In addition, when the processor communicates with the ESIM card, the port 906B in the third switch 906 is connected to the port 906F in the third switch 906, and the port 906F is open-circuited (such as suspended), which does not affect communication between the processor and the ESIM card.

In this way, the terminal device may realize communication between the processor and the ESIM card. By changing the connection manner of the second switch and the connection manner of the third switch, the switching of the second physical SIM card and the ESIM card is implemented, and practicability and applicability of the terminal device are increased. In addition, the processor is not changed, circuits without and with the ESIM chip can use a same processor, and such a common layout can reduce difficulty of material preparation for the processor and reduce the production cost.

In a possible implementation, the second switch and the third switch in the circuit shown in FIG. 9 are two-out-of-two switches. In this way, the cost may be further reduced.

It may be understood that the cost of the second switch and the third switch shown in FIG. 6 and FIG. 9 is lower than that of the first switch shown in FIG. 2. It should be noted that the two-out-of-two switch has a wide range of applications (for example, configured to control a differential signal), strong multiplexing, and a low cost. Therefore, compared with the circuit shown in FIG. 2, the circuit shown in FIG. 9 has a low cost.

Figure 12:
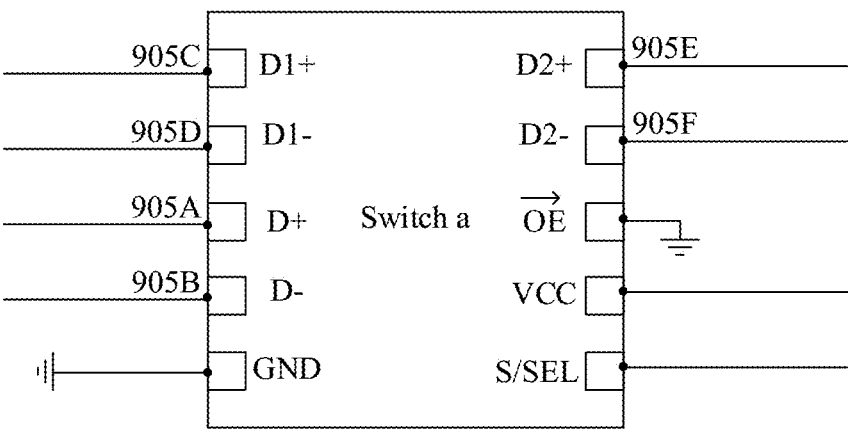
FIG. 12 is a schematic diagram of a structure of a switch according to an embodiment of this application;
Figure 12:
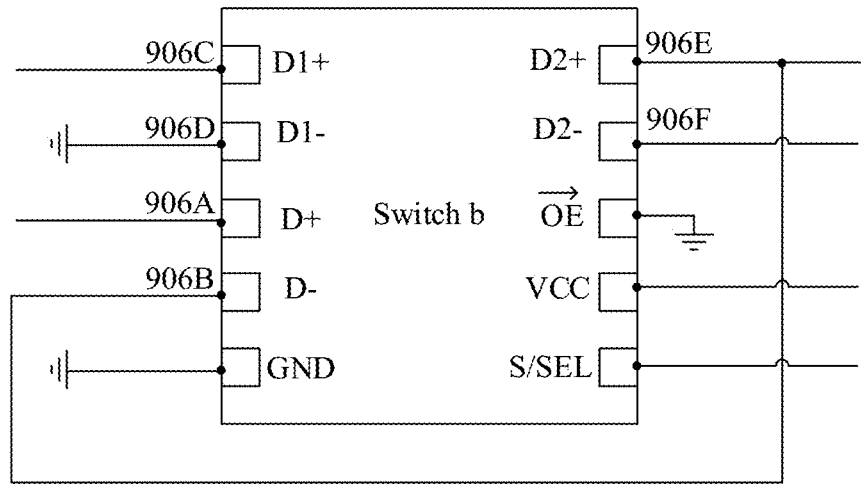

That the second switch and the third switch are switches configured to transmit the differential signal is described below with reference to FIG. 12. For example, FIG. 12 is a schematic diagram of specific structures of a second switch and a third switch according to an embodiment of this application. As shown in FIG. 12, the switch configured to transmit the differential signal includes ten pins, which are a pin for outputting a D+ signal (a pin D1+ and a pin D2+), a pin for outputting a D− signal (a pin D1− and a pin D2−), a pin for inputting a D+ signal (a pin D+), a pin for outputting a D− signal (a pin D−), a pin for providing an operating voltage (a pin VCC), a pin for inputting an enable signal (a pin S/SEL, which may also be marked as a pin EN), a pin for outputting an enable signal (a pin OE, which may also be a pin $\overrightarrow{OE}$) and a pin for grounding (a pin GND), respectively.

The port 905A, the port 905B, the port 905C, the port 905D, the port 905E, and the port 905F of the second switch 905 respectively correspond to the pin D+, the pin D−, the pin D1+, the pin D1−, the pin D2+, and the pin D2− in the switch a shown in FIG. 12.

The port 906A, the port 906B, the port 906C, the port 906D, the port 906E, and the port 906F of the third switch 906 respectively correspond to the pin D+, the pin D−, the pin D1+, the pin D1−, the pin D2+, and the pin D2− in the switch b shown in FIG. 12.

It may be understood that when the pin D+ and the pin D− in the switch a are respectively connected to the pin D1+ and the pin D1− in the switch a, the DATA signal and the RST signal may be transmitted to the second physical SIM card; when the pin D+ in the switch b is connected to the pin D1+ in the switch a, the CLK signal may be transmitted to the second physical SIM card; and when the pin D− in the switch b is connected to the pin D1− in the switch a, the port configured to transmit the CLK signal in the ESIM card is grounded through the pin D2+, the pin D−, and the pin D1− of the switch b, so that the NFC integrated with the ESIM card can enter the low power consumption mode.

When the pin D+ and the pin D− in the switch a are respectively connected to the pin D2+ and the pin D2− in the switch a DATA signal and the RST signal may be transmitted to the ESIM card; when the pin D+ in the switch b is connected to the pin D2+ in the switch a, the CLK signal may be transmitted to the ESIM card; and when the pin D− in the switch b is connected to the pin D2− in the switch a, the pin D2− is suspended and open-circuited, which does not affect communication of the ESIM card.

It may be understood that, in the circuit shown in FIG. 9 above, the second switch is configured to transmit the DATA signal and the RST signal, and the third switch is configured to transmit the CLK signal.

In some embodiments, the second switch 905 is configured to transmit the CLK signal and the RST signal, and the third switch 906 is configured to transmit the DATA signal.

For example, the port DATA2, the port RST2, and the port CLK2 are respectively connected to the port 906A of the third switch 906, and the port 905A and the port 905B of the second switch 905; the port 906C of the third switch 906, and the port 905C and the port 905D of the second switch 905 are respectively connected to the three ports (the port 903A, the port 903B, and the port 903C) of the second card slot 903; the port 906E of the third switch 906, and the port 905E and the port 905F of the second switch 905 are respectively connected to the three ports (the port 904A, the port 904B, and the port 904C) of the ESIM chip 904; and the port 905F of the second switch 905 is connected to the port 906B of the third switch.

In some embodiments, the second switch 905 is configured to transmit the DATA signal and the CLK signal, and the third switch 906 is configured to transmit the RST signal.

For example, the port DATA2, the port RST2, and the port CLK2 are respectively connected to the port 905A of second switch 905, the port 906A of third switch 906, and the port 905B of second switch 905; the port 905C of the second switch 905, the port 906C of the third switch 906, and the port 905D of the second switch 905 are respectively connected to the three ports (the port 903A, the port 903B, and the port 903C) of the second card slot 903; the port 905E of the second switch 905, the port 906E of the third switch 906, and the port 905F of the second switch 905 are respectively connected to the three ports (the port 904A, the port 904B, and the port 904C) of the ESIM chip 904; and the port 905F of the second switch 905 is connected to the port 906B of the third switch.

Embodiments of this application do not limit the specific corresponding connection conditions of the port DATA2, the port RST2, the port CLK2, and the respective ports in the switch unit in the processor.

It may be understood that the arrangement order of the ports in each component in FIG. 9 may also be replaced, and embodiments of this application do not limit ordering and position of the ports in each component in FIG. 9.

It may be understood that the SIM card communication circuit in FIG. 9 to FIG. 12 is described by using two sets of SIM interfaces as an example. In some embodiments, the processor may only one set of SIM interfaces. When the processor includes only one set of SIM interfaces, none of the circuits shown in FIG. 9 to FIG. 12 include the first card slot and the port connected to the first card slot (for example, a port DATA1 in the processor, a port RST1, and a port CLK1).

It may be understood that embodiments shown in FIG. 2 to FIG. 12 respectively illustrate the condition that the switch unit includes one switch and two switches. The switch unit may further include three switches or even more switches. When the switch unit includes three switches or even more switches, the implementation principle of the SIM card communication circuit is similar. Specifically, reference may be made to the circuit shown in FIG. 2 to FIG. 12, which is not be repeated here.

It may be understood that, in the embodiments shown in FIG. 2 to FIG. 12, the ESIM chip shares a set of SIM interfaces with the second card slot. The ESIM chip may also share a set of SIM interfaces with the first card slot, and the circuit connection manner and control method are similar, which are not be repeated in detail here.

It may be understood that, in the embodiments shown in FIG. 2 to FIG. 12, a set of SIM interfaces including three kinds of signals is used as an example for illustration. Therefore, the first output terminal, the second output terminal, and the input terminal of the switch unit all include three ports.

As technology develops, a set of SIM interfaces may include one or more signals, and the first output terminal, the second output terminal, and the input terminal of the switch unit may also include another quantity of ports. The quantity of ports of the first output terminal, the second output terminal, and the input terminal of the switch unit is not limited in embodiments of this application.

The SIM card control method provided by embodiments of this application is described below with reference to FIG. 13 and FIG. 14.

Figure 13:
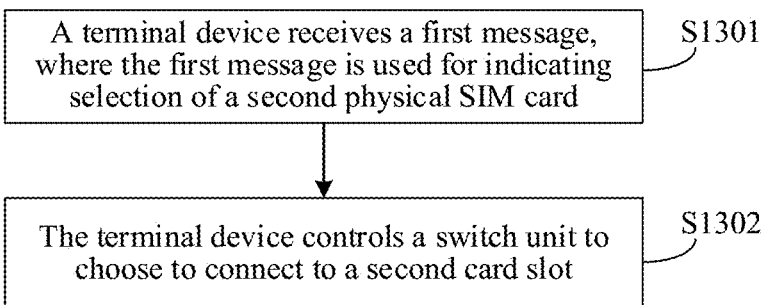
FIG. 13 is a schematic flowchart of a SIM card control method according to an embodiment of this application.

For example, FIG. 13 is a schematic flowchart of a SIM card control method according to an embodiment of this application. As shown in FIG. 13, the method includes the following steps.

S1301: The terminal device receives a first message, where the first message is used for indicating selection of the second physical SIM card.

Specifically, the processor of the terminal device receives the first message.

For example, when the terminal device receives the operation of the user selecting the second physical SIM card, the terminal device receives the first message.

S1302: The terminal device controls the switch unit to choose to connect to the second card slot.

Specifically, the processor of the terminal device controls the switch unit to choose to connect to the second card slot.

For example, when the terminal device includes the circuit shown in FIG. 2, the processor controls the port 205A, the port 205B, and the port 205C in the first switch 205 are respectively connected to the port 205D, the port 205E, and the port 205F in the first switch 205.

When the terminal device includes the circuit shown in FIG. 6, the processor controls the port 605A and the port 605B in the second switch 605 to be connected to the port 605C and the port 605D in the second switch 605; and controls the port 605A in the third switch 606 is connected to the port 605B in the third switch 606.

When the terminal device includes the circuit shown in FIG. 9, the processor controls the port 905A and the port 905B in the second switch 905 to be connected to the port 905C and the port 905D in the second switch 905, and controls the port 905A and the port 905B in the third switch 906 to be connected to the port 905C and the port 906D in the third switch 906.

It may be understood that when the circuit includes the MOS transistor, the processor further controls the MOS transistor to be turned on.

Figure 14:
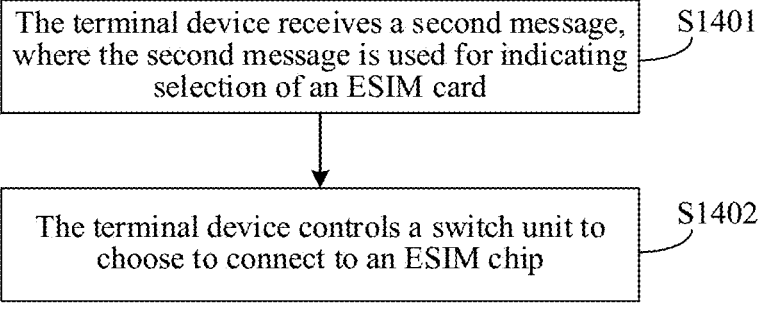
FIG. 14 is a schematic flowchart of a SIM card control method according to an embodiment of this application.

For example, FIG. 14 is a schematic flowchart of a SIM card control method according to an embodiment of this application. As shown in FIG. 14, the method includes the following steps.

S1401: The terminal device receives a second message, where the second message is used for indicating selection of the ESIM card.

Specifically, the processor of the terminal device receives the second message.

For example, when the terminal device receives the operation of the user selecting the ESIM card, the terminal device receives the second message.

S1402: The terminal device controls the switch unit to choose to connect to the ESIM chip.

Specifically, the processor of the terminal device controls the switch unit to choose to connect to the ESIM chip.

For example, when the terminal device includes the circuit shown in FIG. 2, the processor controls the port 205A, the port 205B, and the port 205C in the first switch 205 are respectively connected to the port 205G, the port 205H, and the port 205I in the first switch 205.

When the terminal device includes the circuit shown in FIG. 6, the processor controls the port 605A and the port 605B in the second switch 605 to be connected to the port 605E and the port 605F in the second switch 605, and controls the port 605A in the third switch 606 to be connected to the port 606C in the third switch 606. When the terminal device includes the circuit shown in FIG. 9, the processor controls the port 905A and the port 905B in the second switch 905 to be connected to the port 905E and the port 905F in the second switch 905, controls the port 905A in the third switch 906 to be connected to the port 906C in the third switch 906, and controls the port 906B in the third switch 906 to be connected to the port 906F in the third switch 906.

It may be understood that when the circuit includes the MOS transistor, the processor further controls the MOS transistor to be turned off.

Figure 15:
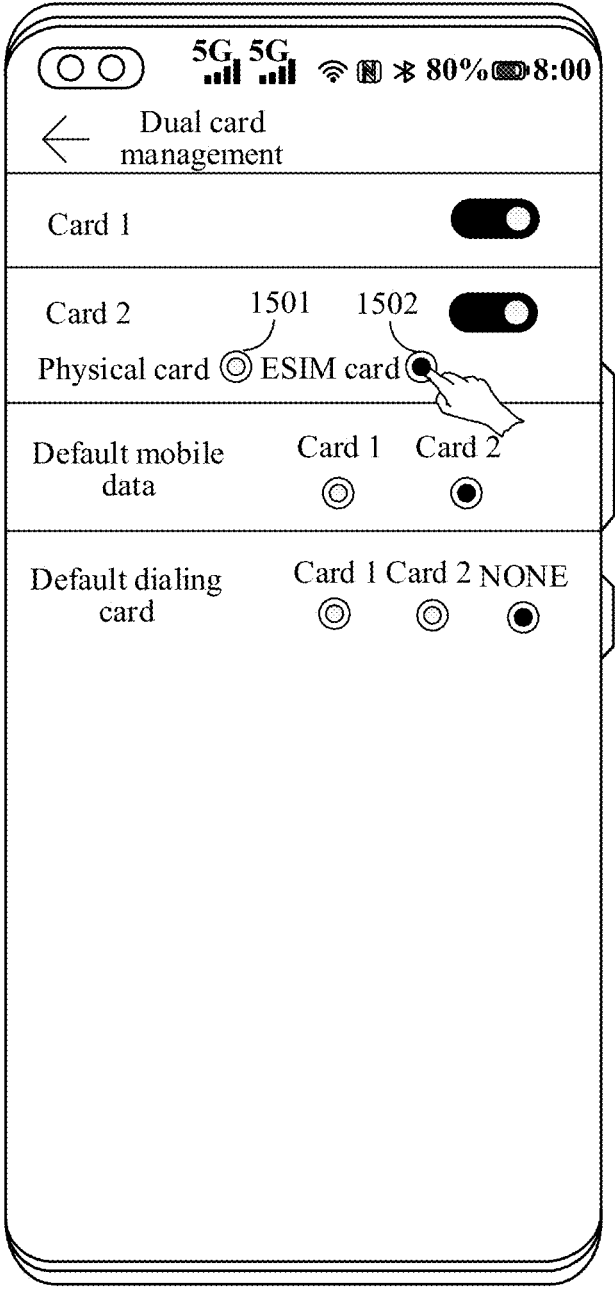
FIG. 15 is a schematic diagram of an interface of a terminal device according to an embodiment of this application.

For example, FIG. 15 is a schematic interface diagram of a terminal device according to an embodiment of this application.

As shown in FIG. 15, the interface includes a plurality of setting. The settings include but are not limited to a SIM interface setting, a default mobile data setting, a default dial card setting, or another types of setting. The SIM interface setting includes a card 1 setting and a card 2 setting. The card 2 settings include a physical card control 1501 and an ESIM card control 1502.

In embodiments of this application, when the terminal device receives the operation of the user clicking the physical card control 1501, the terminal device receives the first message and controls the switch unit to choose to connect to the second card slot. When the terminal device receives the operation of the user clicking the ESIM card control 1502, the terminal device receives the second message and controls the switch unit to choose to connect to the ESIM chip.

It should be noted that the interface shown in FIG. 15 is only an example, and more or less content may also be included in the interface, which is not limited by embodiments of this application. In addition, embodiments of this application do not limit a form, a name, or the like of the control in the interface.

The foregoing describes a touch panel failure communication method in the embodiments of this application. The following describes an apparatus for performing the touch panel failure communication method provided in embodiments of this application. It may be understood by a person skilled in the art that the method and the apparatus can be combined with or refer to each other. The related apparatus provided in this embodiment of this application can perform the steps of the foregoing touch panel failure communication method.

The SIM card control method provided by embodiments of this application may be applicable to an electronic device having a communication function. The electronic device includes a terminal device, and a specific device form of the terminal device may be referred to the above relevant descriptions.

An embodiment of this application provides a terminal device. The terminal device includes a processor and a memory. The memory is configured to store computer-executable instructions. The processor is configured to perform the computer-executable instructions stored in the memory, causing the terminal device to perform the method described above.

The embodiments of this application provide a chip. The chip includes a processor, and the processor is configured to call a computer program in a memory to perform the technical solutions in the foregoing embodiments. Their implementation principles and technical effects are similar those in the related embodiments, and details are not described herein again.

An embodiment of this application further provides a computer-readable storage medium. The computer-readable storage medium stores computer program instructions. When the computer program is executed by the processor, the foregoing method is implemented. All or some of methods in the foregoing embodiments may be implemented by using software, hardware, firmware, or any combination thereof. If implemented in software, a function may be stored on or transmitted on a computer readable medium as one or more instructions or code. The computer readable medium may include a computer storage medium and a communications medium, and may further include any medium that can transmit a computer program from one place to another. The storage medium may be any target medium accessible to a computer.

In a possible implementation, the computer readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. Furthermore, any connection is appropriately referred to as a computer readable medium. For example, if software is transmitted from a website, a server, or another remote source by using a coaxial cable, an optical fiber cable, a twisted pair, a digital subscriber line (Digital Subscriber Line, DSL) or wireless technologies such as infrared ray, radio and microwave, the coaxial cable, optical fiber cable, twisted pair, DSL, or wireless technologies such as infrared ray, radio and microwave are included in fixation of a medium to which they belong. For example, a disk and a disc used by this application include a compact disc, a laser disc, an optical disc, a digital versatile disc (digital versatile disc, DVD), a floppy disk, and a Blu-ray disc. The disk generally magnetically reproduces data, and the disc optically reproduces data by using laser. The foregoing combination should also be included in the scope of the computer-readable medium.

An embodiment of this application further provides a computer program product. The computer program product includes a computer program, and when the computer program runs on a computer, the computer is enabled to perform the foregoing method.

The embodiments of this application are described with reference to the flowcharts and/or block diagrams of the method, the device (system), and the computer program product according to the embodiments of this application. It should be understood that computer program instructions can implement each procedure and/or block in the flowcharts and/or block diagrams and a combination of procedures and/or blocks in the flowcharts and/or block diagrams. The computer program instructions may be provided for a general-purpose computer, a dedicated computer, an embedded processor, or a processing unit of another programmable device to generate a machine, so that the instructions executed by a computer or a processing unit of another programmable data processing device generate an apparatus for implementing a specific function in one or more processes in the flowcharts and/or in one or more blocks in the block diagrams.

The foregoing specific implementations further describe the objectives, technical solutions in detail, and beneficial effects of the present invention. It should be appreciated that the foregoing descriptions are merely specific implementations of the present invention, but are not intended to limit the protection scope of the present invention. Any modification, equivalent replacement, or improvement made based on the technical solutions of the present invention should fall within the protection scope of the present invention.

What is claimed is:

1. A subscriber identity module (SIM) card communication circuit, comprising:
   a controller;
   a switch;
   a first card slot;
   a metal oxide semiconductor (MOS) transistor; and
   an embedded SIM (ESIM) chip;
   wherein the controller is connected to an input terminal of the switch, and a first output terminal and a second output terminal of the switch are respectively connected to the first card slot and the ESIM chip;
   wherein the controller is configured to:
      control the switch to choose to connect to a first physical SIM card in the first card slot when receiving a first message; and
      control the switch to be connected to the ESIM chip when receiving a second message, to implement connection between the controller and the ESIM chip;
   wherein the MOS transistor is located between the switch and the ESIM chip; and
   wherein the controller is further configured to:
      control the MOS transistor to be turned on when receiving the first message, so that the ESIM chip is maintained at a low level; or
      control the MOS transistor to be turned off when receiving the second message.

2. The SIM card communication circuit according to claim 1, wherein the controller comprises a first port, a second port, and a third port, the first port is configured to transmit a data (DATA) signal, the second port is configured to transmit a reset (RST) signal, and the third port is configured to transmit a clock (CLK) signal;
   wherein the input terminal of the switch comprises a fourth port, a fifth port, and a sixth port, the first output terminal of the switch comprises a seventh port, an eighth port, and a ninth port, the second output terminal of the switch comprises a tenth port, an eleventh port, and a twelfth port;
   wherein the first card slot comprises a thirteenth port, a fourteenth port, and a fifteenth port;
   wherein the ESIM chip comprises a sixteenth port, a seventeenth port, and an eighteenth port; and
   wherein the first port, the second port, and the third port are respectively connected to the fourth port, the fifth port, and the sixth port, the seventh port, the eighth port, and the ninth port are respectively connected to the thirteenth port, the fourteenth port, and the fifteenth port, and the tenth port, the eleventh port, and the twelfth port are respectively connected to the sixteenth port, the seventeenth port, and the eighteenth port.

3. The SIM card communication circuit according to claim 2, wherein the controller is further configured to:
   control the fourth port, the fifth port, and the sixth port to be connected to the seventh port, the eighth port, and the ninth port respectively when receiving the first message, to implement connection between the controller and the first physical SIM card in the first card slot; or
   control the fourth port, the fifth port, and the sixth port to be connected to the tenth port, the eleventh port, and the twelfth port respectively when receiving the second message, to implement connection between the controller and the ESIM chip.

4. The SIM card communication circuit according to claim 2, wherein the switch comprises a first switch, the first switch comprises the fourth port, the fifth port, the sixth port, the seventh port, the eighth port, the ninth port, the tenth port, the eleventh port, and the twelfth port.

5. The SIM card communication circuit according to claim 2, wherein the switch comprises a second switch and a third switch, the second switch comprises the fourth port, the fifth port, the seventh port, the eighth port, the tenth port, and the eleventh port, and the third switch comprises the sixth port, the ninth port, and the twelfth port.

6. The SIM card communication circuit according to claim 2, wherein the MOS transistor is located between the twelfth port and the eighteenth port.

7. The SIM card communication circuit according to claim 1, further comprising a near field communication (NFC) chip, wherein the ESIM chip and the NFC chip are integrated together.

8. A terminal device, comprising a subscriber identity module (SIM) card communication circuit, comprising:
   a controller;
   a switch;
   a first card slot;
   a metal oxide semiconductor (MOS) transistor; and
   an embedded SIM (ESIM) chip;
   wherein the controller is connected to an input terminal of the switch, and a first output terminal and a second output terminal of the switch are respectively connected to the first card slot and the ESIM chip;
   wherein the controller is configured to:
   control the switch to choose to connect to a first physical SIM card in the first card slot when receiving a first message; and
   control the switch to be connected to the ESIM chip when receiving a second message, to implement connection between the controller and the ESIM chip;
   wherein the MOS transistor is located between the switch and the ESIM chip; and
   wherein the controller is further configured to:
   control the MOS transistor to be turned on when receiving the first message, so that the ESIM chip is maintained at a low level; or
   control the MOS transistor to be turned off when receiving the second message.

9. The SIM card communication circuit according to claim 1, further comprising a first level conversion apparatus, wherein the first level conversion apparatus is located between the controller and the first card slot.

10. The SIM card communication circuit according to claim 1, further comprising a second card slot, wherein the second card slot is connected to the controller.

11. An electronic, device comprising a subscriber identity module (SIM) card communication circuit, comprising:

a controller;

a switch;

a first card slot; and an embedded SIM (ESIM) chip;

wherein the controller is connected to an input terminal of the switch, and a first output terminal and a second output terminal of the switch are respectively connected to the first card slot and the ESIM chip;

wherein the controller is configured to:

control the switch to choose to connect to a first physical SIM card in the first card slot when receiving a first message; and control the switch to be connected to the ESIM chip when receiving a second message, to implement connection between the controller and the ESIM chip; and wherein the switch further comprises a nineteenth port, a twentieth port, and a twenty-first port, the nineteenth port is connected to a twelfth port, the twentieth port is grounded, and the twenty-first port is open-circuited, and the twelfth port is used to transmit a clock (CLK) signal to the ESIM chip.

12. The SIM card communication circuit according to claim 11, wherein the controller comprises a first port, a second port, and a third port, the first port is configured to transmit a data (DATA) signal, the second port is configured to transmit a reset (RST) signal, and the third port is configured to transmit the CLK signal;

wherein the input terminal of the switch comprises a fourth port, a fifth port, and a sixth port, the first output terminal of the switch comprises a seventh port, an eighth port, and a ninth port, the second output terminal of the switch comprises a tenth port, an eleventh port, and a twelfth port;

wherein the first card slot comprises a thirteenth port, a fourteenth port, and a fifteenth port;

wherein the ESIM chip comprises a sixteenth port, a seventeenth port, and an eighteenth port;

wherein the first port, the second port, and the third port are respectively connected to the fourth port, the fifth port, and the sixth port, the seventh port, the eighth port, and the ninth port are respectively connected to the thirteenth port, the fourteenth port, and the fifteenth port, and the tenth port, the eleventh port, and the twelfth port are respectively connected to the sixteenth port, the seventeenth port, and the eighteenth port.

13. The SIM card communication circuit according to claim 11, wherein the controller is further configured to:

control the fourth port, the fifth port, the sixth port, and the nineteenth port to be connected to the seventh port, the eighth port, the ninth port, and twentieth port respectively when receiving the first message, to implement connection between the controller and the first physical SIM card in the first card slot; or control the fourth port, the fifth port, the sixth port, and the nineteenth port to be connected to the tenth port, the eleventh port, the twelfth port, and the twenty-first port respectively when receiving the second message, to implement connection between the controller and the ESIM chip.

14. The SIM card communication circuit according to claim 12, wherein the switch comprises a first switch, and the first switch comprises the fourth port, the fifth port, the sixth port, the seventh port, the eighth port, the ninth port, the tenth port, the eleventh port, the twelfth port, the nineteenth port, the twentieth port, and the twenty-first port.

15. The SIM card communication circuit according to claim 12, wherein the switch comprises a second switch and a third switch, the second switch comprises the fourth port, the fifth port, the seventh port, the eighth port, the tenth port, and the eleventh port, and the third switch comprises the sixth port, the ninth port, the twelfth port, the nineteenth port, the twentieth port, and the twenty-first port.

16. The SIM card communication circuit according to claim 11, further comprising a near field communication (NFC) chip, wherein the ESIM chip and the NFC chip are integrated together.

17. The SIM card communication circuit according to claim 11, further comprising a second card slot, wherein the second card slot comprises a twenty-second port, a twenty-third port, and a twenty-fourth port;

wherein the controller further comprises a twenty-fifth port, a twenty-sixth port, and a twenty-seventh port, the twenty-fifth port is configured to transmit a (DATA) signal, the twenty-sixth port is configured to transmit an reset (RST) signal, and the twenty-seventh port is configured to transmit the CLK signal; and wherein the twenty-fifth port, the twenty-sixth port and the twenty-seventh port are respectively connected to the twenty-second port, the twenty-third port, and the twenty-fourth port, to implement connection between the controller and a second physical SIM card in the second card slot.

18. A subscriber identity module (SIM) card control method, comprising:

receiving, by a controller of a SIM card communication circuit, first information for indicating selection of a first physical SIM card in a first card slot, and controlling, by the controller, a switch of the SIM card communication circuit to choose to connect to the first physical SIM card in the first card slot based on the first information; or receiving, by the controller, second information for indicating selection of an embedded SIM (ESIM) chip, and controlling, by the controller, the switch to choose to connect to the ESIM chip based on the second information; and wherein the controller is connected to an input terminal of the switch, and a first output terminal and a second output terminal of the switch are respectively connected to the first card slot and the ESIM chip.

19. The method according to claim 18, further comprising:

controlling, by the controller, a MOS transistor of the SIM card communication circuit to be turned on based on the first information; or controlling, by the controller, the MOS transistor to be turned off based on the second information.

\*    \*    \*    \*    \*